US011995895B2

(12) United States Patent
Shin et al.

(10) Patent No.: US 11,995,895 B2
(45) Date of Patent: May 28, 2024

(54) MULTI-OBJECT TRACKING USING CORRELATION FILTERS IN VIDEO ANALYTICS APPLICATIONS

(71) Applicant: NVIDIA Corporation, Santa Clara, CA (US)

(72) Inventors: Joonhwa Shin, Santa Clara, CA (US); Zheng Liu, Los Altos, CA (US); Kaustubh Purandare, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 631 days.

(21) Appl. No.: 16/887,574

(22) Filed: May 29, 2020

(65) Prior Publication Data

US 2020/0380274 A1 Dec. 3, 2020

Related U.S. Application Data

(60) Provisional application No. 62/856,666, filed on Jun. 3, 2019.

(51) Int. Cl.
*G06F 17/15* (2006.01)
*G06T 1/20* (2006.01)
(Continued)

(52) U.S. Cl.
CPC ............. *G06T 7/292* (2017.01); *G06F 17/15* (2013.01); *G06T 1/20* (2013.01); *G06T 11/20* (2013.01);
(Continued)

(58) Field of Classification Search
CPC ........ G06V 20/10; G06V 20/58; G06V 10/82; G06T 1/20; G06T 11/20; G06F 17/15
See application file for complete search history.

(56) References Cited

U.S. PATENT DOCUMENTS 8,344,894 B2 * 1/2013 Szczerba ............... G01S 13/867
340/576
9,715,761 B2 * 7/2017 Lee .......................... G06T 7/55
(Continued)

FOREIGN PATENT DOCUMENTS

| CN | 107424177 | * 12/2017 | ............. G06T 7/246 |
| CN | 109977971 | * 5/2019 | ............. G06T 7/90 |
| JP | 2010-117952 A | 5/2010 | |

OTHER PUBLICATIONS

Lukezic, Alan, et al. "Discriminative correlation filter with channel and spatial reliability." Proceedings of the IEEE Conference on Computer Vision and Pattern Recognition. 2017.
(Continued)

*Primary Examiner* — Olga V Merkoulova
(74) *Attorney, Agent, or Firm* — Taylor English Duma L.L.P.

(57) ABSTRACT

In various examples, image areas may be extracted from a batch of one or more images and may be scaled, in batch, to one or more template sizes. Where the image areas include search regions used for localization of objects, the scaled search regions may be loaded into Graphics Processing Unit (GPU) memory and processed in parallel for localization. Similarly, where image areas are used for filter updates, the scaled image areas may be loaded into GPU memory and processed in parallel for filter updates. The image areas may be batched from any number of images and/or from any number of single- and/or multi-object trackers. Further aspects of the disclosure provide approaches for associating locations using correlation response values, for learning correlation filters in object tracking based at least on focused windowing, and for learning correlation filters in object tracking based at least on occlusion maps.

20 Claims, 20 Drawing Sheets

(51) Int. Cl.
  *G06T 7/292* (2017.01)
  *G06T 11/20* (2006.01)
  *G06V 10/764* (2022.01)
  *G06V 10/82* (2022.01)
  *G06V 20/10* (2022.01)
  *G06V 20/58* (2022.01)

(52) U.S. Cl.
  CPC ............ *G06V 10/764* (2022.01); *G06V 10/82* (2022.01); *G06V 20/10* (2022.01); *G06V 20/58* (2022.01); *G06T 2210/12* (2013.01)

(56) References Cited

U.S. PATENT DOCUMENTS

| | | | |
|---|---|---|---|
| 9,767,598 B2* | 9/2017 | Winder | G06T 15/04 |
| 10,885,698 B2 | 1/2021 | Muthler et al. | |
| 11,068,741 B2* | 7/2021 | Wang | G06V 40/168 |
| 11,182,598 B2 | 11/2021 | Sriram et al. | |
| 11,449,709 B2* | 9/2022 | Firner | G06V 10/774 |
| 2005/0174429 A1* | 8/2005 | Yanai | B60R 1/00 348/148 |
| 2018/0357212 A1* | 12/2018 | Windmark | G06F 40/169 |
| 2019/0043168 A1* | 2/2019 | Rampal | G06V 10/52 |
| 2019/0066311 A1* | 2/2019 | Träff | G06T 7/90 |
| 2019/0094040 A1* | 3/2019 | Lewis | B60Q 9/008 |
| 2019/0205694 A1* | 7/2019 | Wang | G06T 7/50 |
| 2019/0303759 A1 | 10/2019 | Farabet et al. | |
| 2021/0042575 A1* | 2/2021 | Firner | G01S 13/931 |

OTHER PUBLICATIONS

Jun, Liang, and Wu Yan. "Correlation particle filter." 2017 13th IEEE International Conference on Electronic Measurement & Instruments (ICEMI). IEEE, 2017.

Zhang, Tianzhu, et al. "Correlation particle filter for visual tracking." IEEE Transactions on Image Processing 27.6 (2017): 2676-2687.

International Preliminary Report on Patentability received for PCT Application No. PCT/US2020/035224, dated Dec. 16, 2021, 8 pages.

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).

ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.

IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.

Kang, X. et al., "Attention-Mechanism-based Tracking Method for Intelligent Internet of Vehicles", Cornell University, pp. 1-17 (Oct. 29, 2018).

International Search Report and Written Opinion received for PCT Patent Application No. PCT/US2020/035224, dated Sep. 18, 2020, 9 pages.

Kang, et al.; "Corrected Continuous Correlation Filter for Long-Term Tracking"; IEEE Access, Mar. 16, 2018, 11 pgs.

* cited by examiner

MULTI-OBJECT TRACKING USING CORRELATION FILTERS IN VIDEO ANALYTICS APPLICATIONS

CROSS-REFERENCE TO RELATED APPLICATIONS

This application claims the benefit of U.S. Provisional Application No. 62/856,666, filed on Jun. 3, 2019, which is hereby incorporated by reference in its entirety.

BACKGROUND

Efficient and effective object tracking is a critical task in a visual perception pipeline, as it bridges inference results across video frames, enabling temporal analysis of objects of interest. Tracking multiple objects is a key problem for many applications such as surveillance, animation, activity recognition, or vehicle navigation. Conventional multi-object trackers may be implemented using independent single-object trackers that run on full-frames of video and track objects by associating bounding boxes between frames. Tracking is typically performed on a single video stream and divided into localization and data association. For localization, each single-object tracker may independently estimate a location of a detected object in a frame—and for data association—estimated object locations from the trackers may be linked across frames to form complete trajectories. Discriminative Correlation Filters (DCFs) have recently been used for localization in object tracking. DCF-based trackers may define a search region around an object of interest, where an optimal correlation filter is learned so that the object can be localized in the next frame as the peak location of a correlation response within the search region.

Single-object trackers may each analyze and generate data that is non-homogenous across trackers, such as using image areas of video and correlation filters (in the case of DCF-based trackers) of various sizes and shapes. The non-homogenous data of a tracker is serially processed by the tracker, then combined in data association. In examples where conventional approaches are implemented in a system running many single-object trackers—and potentially many multi-object trackers (one per video stream)—processing and data storage requirements may limit the number of objects that may be concurrently tracked. Conventional approaches further have difficulty tracking objects in crowded environments and/or environments where occlusions are common, making tracking a challenging task.

SUMMARY

Embodiments of the present disclosure relate to multi-object tracking using correlation filters. Systems and methods are disclosed that may improve the computational and storage efficiency of multi-object trackers, such as those implemented using correlation filters. Additional aspects of the disclosure relate to various improvements to implementations of correlation filters for object tracking, such as in multi-object trackers.

In contrast to conventional systems, such as those described above, image areas may be extracted from a batch of one or more images and may be scaled, in batch, to one or more template sizes. Where the image areas include search regions used for localization of objects, the scaled search regions may be loaded into Graphics Processing Unit (GPU) memory and processed in parallel for localization. Similarly, where image areas are used for filter updates, the scaled image areas may be loaded into GPU memory and processed in parallel for filter updates. The image areas may be batched from any number of images and/or from any number of single- and/or multi-object trackers. Further aspects of the disclosure provide approaches for associating locations using correlation response values, for learning correlation filters in object tracking based at least on focused windowing, and for learning correlation filters in object tracking based at least on occlusion maps.

BRIEF DESCRIPTION OF THE DRAWINGS

The present systems and methods for multi-object trackers using correlation filters are described in detail below with reference to the attached drawing figures, wherein.

DETAILED DESCRIPTION

Figure 1:
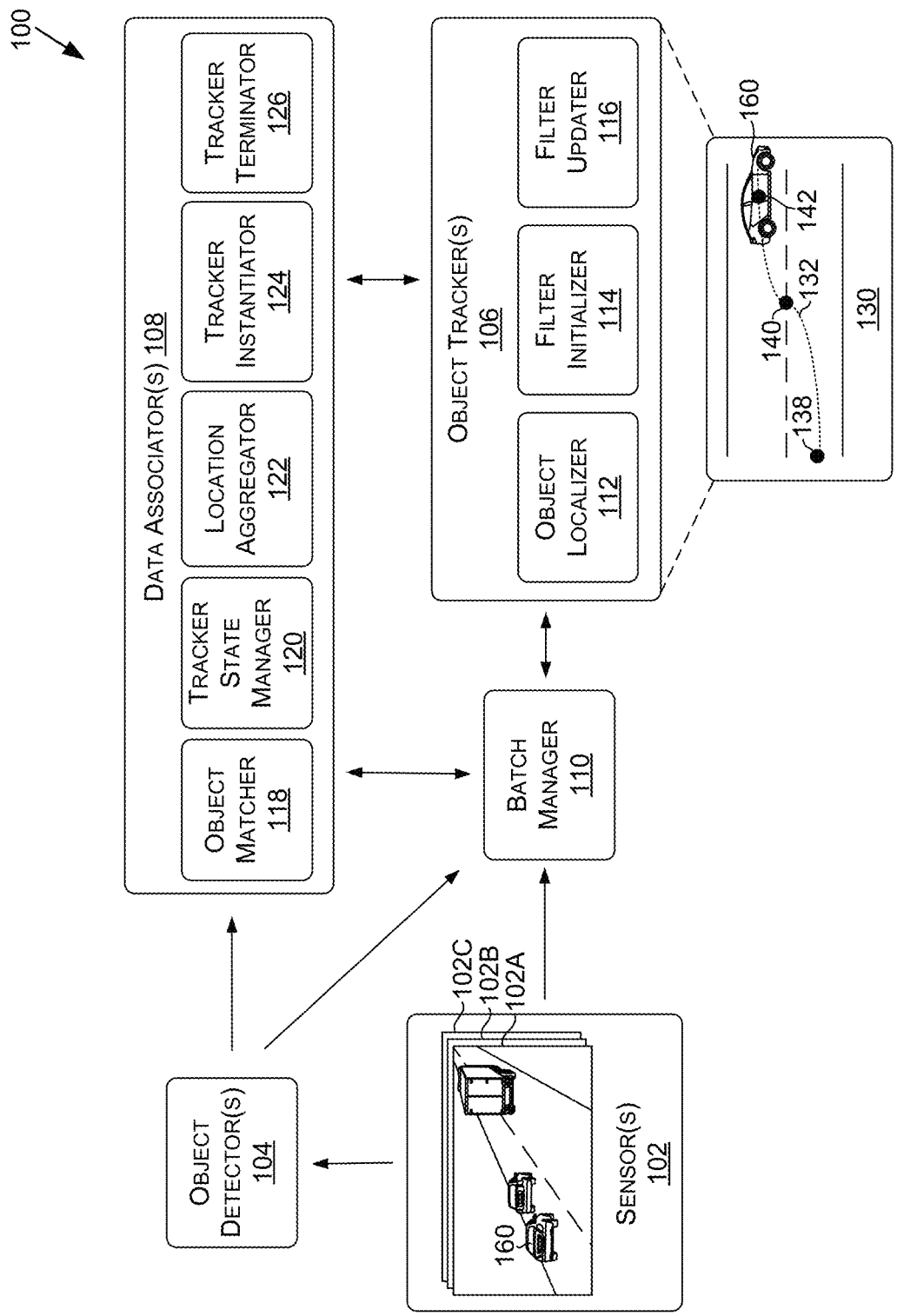
FIG. 1 is a diagram illustrating an example of an object tracking system, in accordance with some embodiments of the present disclosure.

Systems and methods are disclosed related to multi-object trackers using correlation filters. Systems and methods are disclosed that may improve the computational and storage efficiency of multi-object trackers, such as those implemented using correlation filters. Additional aspects of the disclosure relate to various improvements to implementations of correlation filters for object tracking, such as in multi-object trackers.

Disclosed embodiments may be implemented in a variety of different perception-based object tracking and/or identification systems such as in automotive systems, robotics, aerial systems, boating systems, smart area monitoring, simulation, and/or other technology areas. Disclosed approaches may be used for any perception-based control, analysis, monitoring, tracking and/or behavior modification of machine and/or systems.

For smart area monitoring, various disclosed embodiments may be incorporated into systems and/or methods described in U.S. Non-Provisional application Ser. No. 16/365,581, filed on Mar. 26, 2019, and titled "Smart Area Monitoring with Artificial Intelligence," which is hereby incorporated by reference in its entirety.

For simulation, various disclosed embodiments may be incorporated into systems and/or methods described in U.S. Non-Provisional application Ser. No. 16/366,875, filed on Mar. 27, 2019, and titled "Training, Testing, and Verifying Autonomous Machines Using Simulated Environments," which is hereby incorporated by reference in its entirety.

For locomotive systems, although the present disclosure may be described with respect to an example autonomous vehicle 1500 (alternatively referred to herein as "vehicle 1500" or "ego-vehicle 1500," an example of which is described herein with respect to FIGS. 15A-15D), this is not intended to be limiting. For example, the systems and methods described herein may be used by non-autonomous vehicles, semi-autonomous vehicles (e.g., in one or more advanced driver assistance systems (ADAS)), robots, warehouse vehicles, off-road vehicles, flying vessels, boats, and/or other vehicle types.

In contrast to conventional systems, such as those described above, image areas may be extracted from a batch of one or more images and may be scaled, in batch, to one or more template sizes. In doing so, sizes and shapes of the scaled image areas—as well as correlation filters and correlation responses in correlation filter-based approaches—may be made more homogenous. This may reduce storage sizes and improve processing efficiency, while allowing for the image areas to be analyzed and processed efficiently and effectively in parallel, such as using threads of one or more GPU. For example, where the image areas include search regions used for localization of objects, the scaled search regions may be loaded into GPU memory and processed in parallel for localization. Similarly, where image areas are used for filter updates, the scaled image areas may be loaded into GPU memory and processed in parallel for filter updates. Using disclosed approaches, the image areas may be batched from any number of images and/or from any number of single- and/or multi-object trackers, allowing for parallelization of processing across single-object trackers and/or video streams.

Further aspects of the disclosure provide approaches for associating locations using correlation response values. An estimated location of an object may be determined using a correlation filter that has a correlation response at the estimated location. When determining whether to associate a location with the estimated location, a value(s) of the correlation response may be determined for the location and used as a visual feature for the determination. Thus, visual features need not be separately extracted from an image for the location.

Additional aspects of the disclosure provide for learning correlation filters in object tracking based at least on focused windowing. When learning a correlation filter from an image area, a focused window may be applied to the image area (e.g., one or more channels thereof) that blurs the background of a target object with the blur increasing based on distance from the target. The focused window may be applied to one or more color and/or feature channels of an image using a Gaussian filter. The correlation filter may be learned from the blurred image, thereby reducing learning from the background while still allowing the background to provide learning of context around the target object. Additionally, where the image area is a search region used to locate the target object, a larger search region may be used without risking overlearning of the background.

The disclosure further provides for learning correlation filters in object tracking based at least on occlusion maps. When learning a correlation filter from an image area, an occlusion map may be applied to the image area that masks, excludes, and/or blurs occlusions of the target object. The correlation filter may be learned from the modified image, thereby reducing or eliminating learning from occlusions while still allowing for learning the target object from exposed portions. The occlusion maps may be generated using a machine learning model, such as a Gaussian Mixture Model (GMM) that is trained (e.g., using the image areas used to learn the correlation filter) using the target object as a background so that occlusions are detected as foreground.

FIG. 1 is a diagram illustrating an example of an object tracking system 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. By way of example, the object tracking system 100 may be implemented on one or more instances of the computing device 1600 of FIG. 16.

The object tracking system 100 may include, among other things, a sensor(s) 102, an object detector(s) 104, an object tracker(s) 106, a data associator(s) 108, and a batch manager 110.

The sensor(s) 102 may be configured to generate sensor data, such as image data representing one or more images (e.g., images 102A, 102B, or 102C), which may be frames of one or more video streams. The object detector(s) 104 may be configured to detect objects in the sensor data, which may include detected object locations, such as one or more points of bounding boxes or other shapes within the images. The object tracker(s) 106 may be configured to analyze the sensor data, and in some examples the detected object locations, to localize detected objects in the frames based at least on determining one or more estimated object locations. The data associator(s) 108 may be configured to manage object tracking across frames and/or video streams based at least on linking the estimated object location(s) across frames (e.g., to generate a trajectory 132). This may include associating and/or assign the estimated object location(s) to one or more objects and/or detected objects, such as based at least on assigning object identifiers (IDs) to the estimated object locations. The batch manager 110 may be configured to manage batched processing in the object tracking system 100 for implementations that employ batched processing.

The object tracker(s) 106 may include an object localizer 112. In implementations that employ a correlation filter, the object tracker(s) 106 may further include a filter initializer 114 and a filter updater 116. The object localizer 112 maybe configured to localize detected objects using one or more machine learning models. For example, the machine learning model(s) may be implemented using correlation filters learned using the filter initializer 114 and the filter updater 116. The filter initializer 114 may be configured to initialize a correlation filter, for example, for a newly tracked and/or detected object (e.g., by the object detector 104). The filter updater 116 may be configured to update the correlation filter, for example, for a previously tracked object (e.g., previously localized by the object tracker 106). In some examples, each object tracker 106 may be responsible for tracking and maintaining state of a single respective object.

The data associator(s) 108 may include an object matcher 118, a tracker state manager 120, a location aggregator 122, a tracker instantiator 124, and a tracker terminator 126. The object matcher 118 may be configured to match estimated object locations from the object tracker(s) 106 to one or more detected object locations (e.g., from the object detector(s) 104) and/or object IDs. The tracker state manager 120 may be configured to manage states of object trackers, such as the object tracker(s) 106. For example, the tracker state manager 120 may manage states of the object trackers based at least on matching results of the object matcher 118.

The tracker state manager 120 may use the location aggregator 122, which is configured to aggregate, combine, and/or merge object locations. The locations may include a detected object location from an object detector 104 and an estimated object location from an object tracker 106 that is matched to the detected object location by the object matcher 118. The tracker state manager 120 may assign the aggregated location to the state of the object tracker 106 for the image and/or frame. The tracker state manager 120 may also use the tracker instantiator 124, which is configured to instantiate a new object tracker 106. The tracker state manager 120 may instantiate an object tracker 106 for a detected object location from an object detector 104 that the object matcher 118 is unable to match to an estimated object location and/or previously tracked object. The tracker state manager 120 may further use the tracker terminator 126, which is configured to terminate an existing object tracker 106. The tracker state manager 120 may terminate an object tracker 106 for an estimated object location from the object tracker 106 that the object matcher 118 is unable to match to a detected object location from an object detector 104, an estimated object location from a previous frame, and/or previously tracked object (e.g., where localization fails and/or has less than a threshold level of confidence). In some examples, the tracker state manager(s) 120 may further be used for re-identification of tracked objects across frames and/or video streams (e.g., merging detections of the same object across video streams and/or activating a tracker for an object that reappeared). In some examples, each data associator 108 may be responsible for multi-object tracking within a respective video stream and/or feed.

As described herein, the sensor(s) 102 may be configured to generate sensor data, such as image data representing one or more images (e.g., images 102A, 102B, or 102C), which may be frames of one or more video streams. In some examples, the sensor data may be generated by any number of sensors, such as one or more image sensors of one or more video cameras. Other examples of sensors that may be employed include a LIDAR sensor(s), a RADAR sensor, an ultrasonic sensor(s), a microphone(s), and/or other sensor types. The sensor data may represent one or more fields of view and/or sensory fields of the sensor(s) 102, and/or may represent a perception of the environment by one or more of the sensors 102.

Sensors such as image sensors (e.g., of cameras), LIDAR sensors, RADAR sensors, SONAR sensors, ultrasound sensors, and/or the like may be referred to herein as perception sensors or perception sensor devices, and the sensor data generated by the perception sensors may be referred to herein as perception sensor data. In some examples, an instance of the sensor data may represent an image captured by an image sensor, a depth map generated by a LIDAR sensor, and/or the like. LIDAR data, SONAR data, RADAR data, and/or other sensor data types may be correlated with, or associated with, image data generated by one or more image sensors. For example, image data representing one or more images may be updated to include data related to LIDAR sensors, SONAR sensors, RADAR sensors, and/or the like, such that the sensor data used by the object detector(s) 104 and/or the object tracker(s) 106 may be more informative or detailed than image data alone. As such, object tracking may be implemented using this additional information from any number of perception sensors.

In various embodiments, the filter initializer 114 and/or the filter updater 116 may learn a correlation filter (e.g., a DCF) that produces and/or is used to identify a peak correlation response from a target in an image area. For example, the correlation filter may be learned to produce the peak correlation response at a center of the target in the image area. The object localizer 112 may use the correlation filter to localize the target in a search region based at least on determining a peak location of the correlation response, which may correspond to an estimated object location. At each frame, an optimal filter may be created that generates the peak correlation response at the target location on a per-frame basis. The filter updater 116 may update a correlation filter using positive and/or negative samples which may be based on the object location determined using the object localizer 112. The filter updater 116 may use an image area (e.g., the search area) that corresponds to the object location and find a filter that maximizes the correlation response to a positive sample and minimizes the correlation response to negative samples (e.g., for a DCF). The filter updater 116 may update a target model of a correlation filter based at least in part on an Exponential Moving Average (EMA) of the optimal filters generated at each frame. This approach may be used for temporal consistency across frames. For example, a correlation filter F may be computed at frame N using Equation (1):

$$F(N)=\alpha * \text{observation} + (1-a) * F(N-1) \tag{1}$$

where α may represent a learning rate and observation may represent a correlation filter created for frame N.

In various embodiments, the learning rate α may be based at least on a correlation response Signal-to-Noise Ratio (SNR). In embodiments where a confidence score is employed, the confidence score and/or ratio between correlation response values described herein may be used to determine the learning rate α (e.g., the learning rate may be a function of or proportional to the confidence score and/or ratio). For example, where the ratio and/or confidence score is lower, a lower learning rate may be used when updating the target appearance model of a correlation filter and a higher learning rate may be used when ratio and/or confidence score is higher.

Various types of correlation filters are contemplated as being within the scope of the present disclosure. A correlation filter may refer to a class of classifiers that are configured to produce peaks in correlation outputs, or responses, such as to achieve accurate localization of targets in scenes. Examples of suitable correlation filters include a Kernelized Correlation Filter (KCF), a discriminative Correlation Filter (DCF), a Correlation Filter Neural Network (CFNN), a Multi-Channel Correlation Filter (MCCF), a Kernel Correlation Filter, an adaptive correlation filter, and/or other filter types. KCFs are a variant of DCFs that use a so-called "Kernel Trick" when solving internal optimizations so as to find a global minimum during the filter update phase. All other workflows may be identical as in typical DCFs.

A correlation filter may be implemented using one or more Machine Learning Models (MLMs). MLMs as described herein may take a variety of forms for example, and without limitation, the MLM(s) may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, long/short term memory/LSTM, Hopfield, Boltzmann, deep belief, deconvolutional, generative adversarial, liquid state machine, etc.), and/or other types of machine learning models.

In at least one embodiment, a location of the search region in a frame may be based at least on a previously determined location associated with an object. For example, the search region may be offset from the previously determined location and may include the previously determined location. Examples of the previously determined location include a detected location of the object determined by the object detector 104 (e.g., for a previous frame), an estimated location of the object determined by the object tracker 106 for a previous frame, and/or a combination thereof. For example, where a search region is based on a combination of the estimated location and the detected location, the location aggregator 122 may aggregate, combine, fuse, and/or merge the estimated location with the detected location to produce the combined location. The aggregated location may be the estimated location, the detected location, or a different location that is based on those locations (e.g., a statistical combination).

Figure 2:
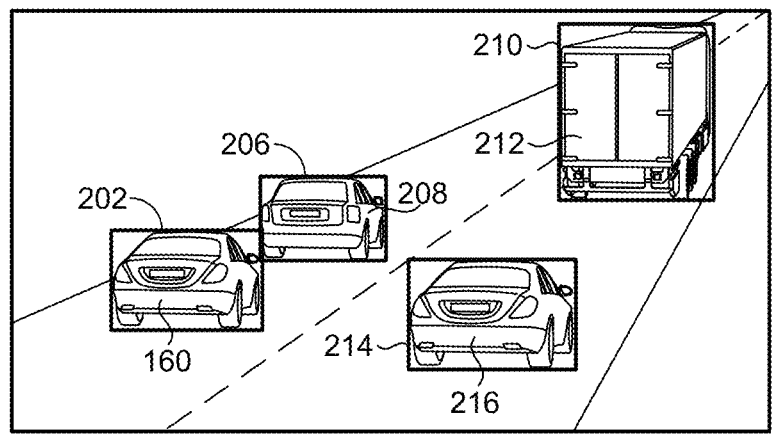
FIG. 2 is a diagram illustrating an example how the object tracking system of FIG. 1 may implement multi-object tracking over a number of frames, in accordance with some embodiments of the present disclosure.
Figure 2:
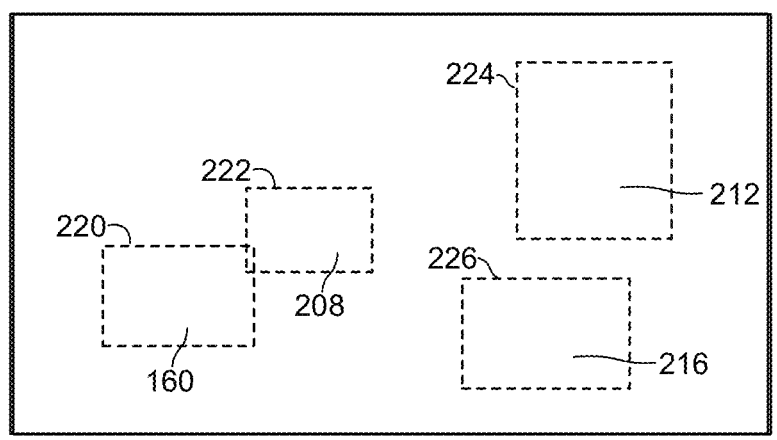
Figure 2:
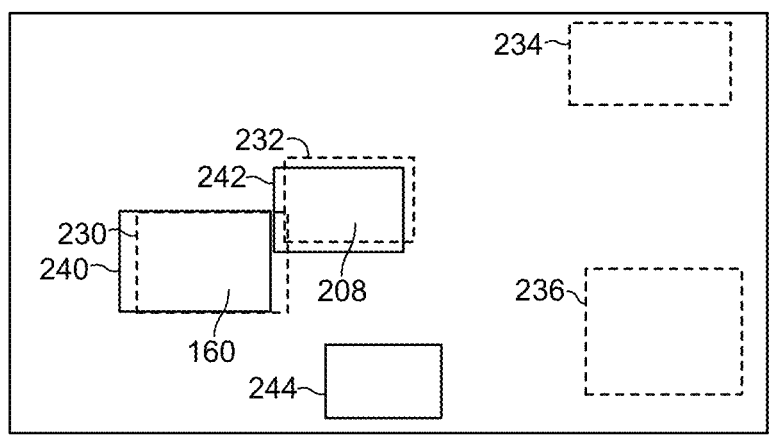

Referring now to FIG. 2, FIG. 2 is a diagram illustrating an example how the object tracking system 100 of FIG. 1 may implement multi-object tracking over a number of frames, in accordance with some embodiments of the present disclosure. FIG. 2 shows Frames 0, 1, and 2 by way of example, which may belong to a same video stream. The video stream may be analyzed using the object tracking system 100 of FIG. 1 to, for one or more objects detected in the video stream, generate trajectory data of a trajectory of the object and/or to track the trajectory over a number of frames. For example, trajectory data 130 of a trajectory 132 of an object 160 (e.g., a vehicle) may be generated and/or the trajectory 132 may be tracked over a number of frames. The numbers used to label the frames are intended to indicate the temporal relationship between the frames, and not necessarily that the frames are consecutive (although they may be). For example, frame 0 may be before Frame 1 in the video, which in turn may be followed by Frame 2, but there may be intervening frames.

At Frame 0, an object detector 104 may analyze one or more portions of image data and/or sensor data (e.g., of and/or temporally related to the frame 0) to detect locations of one or more objects (if any) in the field(s) of view of the sensor(s) 102. As shown, the object detector 104 may determine a location 202 of the object 160, a location 206 of an object 208, a location 210 of an object 212, and a location 214 of an object 216. The data associator 108 may instantiate an object tracker 106 for each detected object location in the frame 0 and assign a new object ID to each object tracker 106.

An instantiated object tracker 106 may use its corresponding location from the object detector 104 to initialize the object localizer 112. This may include learning visual features of the object associated with the location. For example, where a correlation filter is used to learn the visual features of the object 160, the filter initializer 114 may initialize the correlation filter using image data and/or sensor data corresponding to the location 202 in the image. In examples, the filter initializer may extract an image area from the frame 0, which may include at least the location 202 (e.g., an area within the bounding box) and in various examples, a larger area which may correspond to a size of search regions used by the object localizer 112 for estimating object locations. The detected object location 202 may be used as an object location 138 of the trajectory 132 in the state data of the object tracker 106 for the frame 0. Other object trackers 106 may similarly use the locations 206, 210, and 214.

At Frame 1, each object tracker 106 may analyze one or more portions of image data and/or sensor data (e.g., of and/or temporally related to Frame 1) to estimate a location of the objects (if any) in the field(s) of view of the sensor(s) 102. As shown, the object trackers 106 may estimate a location 220 of the object 160, a location 222 of the object 208, a location 224 of the object 212, and a location 226 of the object 216. As an example, to track the object 160, the object tracker 106 may define a search region based at least in part on a previous location of the object 160, and determine the estimated object location 220 based at least on searching for the object 160 within the search region using the visual features learned during initialization.

For example, the location of the search region may be based on the location 202 of the object 160 detected in Frame 0. Where a correlation filter is used, the correlation filter may be applied to the search region to compare locations within the search region to the learned visual features. The estimated object location 220 may be determined based at least on a correlation response of the correlation filter applied to the search region, and may be centered at a location at or based on a peak value of the correlation response or otherwise determined therefrom. The locations 222, 224, and 226 may be similarly estimated.

In the example of Frame 1, detected object locations may not be used to determine object locations for the Frame 1. For example, the object detector(s) 104 may not analyze Frame 1 to compute detected object locations for association with the estimated object locations. In this case, one or more of the estimated object locations 220, 222, 224, and 226 may be used as the object location (e.g., a bounding object) in the state data for the corresponding object tracker 106 for Frame 1 and/or the tracker terminator 126 may terminate or deactivate one or more of the object tracker(s) 106. For example, the detected object location 220 may be used as an object location 140 of the trajectory 132 in the state data of the object tracker 106 for the frame 0 and the object 160. The object location may also be used by the filter updater 116 of the object tracker 106 to update the correlation filter (e.g., using an image area that is based at least on the object location).

Frame 2 is an example where detected object locations are used to determine object locations for a frame, in addition to estimated object locations. In various embodiments, detected object locations may or may not be used to determine object locations for any given frame. For example, detected object locations may be used every frame, may be used periodically (e.g., every N number of frames where N is an integer), or may be used based on evaluating various criteria. When detected object locations are not used for a frame, the object detector(s) 104 need not be in operation, saving computing resources. Similarly, an object tracker 106 may be run every Z number of frames where Z is an integer. For example, the object tracking system 100 may run where N=2 and Z=1, or where N=2 and Z=2. The filter initializer 114 and/or the filter updater 116 may similarly be operated in this strided manner to preserve computing resources.

For Frame 2, each object tracker 106 may determine estimated locations 230, 232, 234, and 236 using a corresponding object localizer 112—similar to what has been described for Frame 1. The object detector(s) 104 may also determine the detected locations 240, 242, and 244 similar to what has been described for Frame 1. The object matcher 118 may attempt to match the estimated locations 230, 232, 234, and 236 to a detected object location of the locations 230, 242, and 244 and/or a previously tracked object.

For example, the estimated location 230 may be matched to the detected location 240 and the estimated location 232 may be matched to the detected location 242. Thus, the location aggregator 122 may aggregate, combine, and/or merge the detected location 240 with the estimated location 232 to determine a location for the corresponding object in frame 2 to determine a location for the corresponding object in frame 2 for a corresponding object tracker 106. For example, the aggregated location may be used as an object location 142 of the trajectory 132 in the state data of the object tracker 106 for the frame 2 and the object 160. The object location may also be used by the filter updater 116 of the object tracker 106 to update the correlation filter (e.g., using an image area that is based at least on the object location). Similarly, the location aggregator 122 may aggregate, combine, and/or merge the detected location 242 with the estimated location 232 to determine a location for the corresponding object in frame 2 for a corresponding object tracker 106. The object location may also be used by the filter updater 116 of the object tracker 106 to update the correlation filter (e.g., using an image area that is based at least on the object location).

The estimated locations 234 and 236 may not be matched to any detected location and/or tracked object. As a result, the tracker terminator 126 may terminate and/or deactivate tracking for corresponding objects. The detected location 244 may also be unmatched to any estimated location and/or tracked object. As a result, the tracker instantiator 124 may instantiate an object tracker 106 for a new object, as descried herein. For example, the detected location 244 may be used by the filter initializer 114 to initialize a correlation filter of the object tracker 106.

As can be seen with respect to FIG. 2, a significant number of images areas may be extracted, processed, and analyzed for object tracking, in the object tracking system 100, particularly where many object trackers 106 and/or video streams are employed. Likewise, a significant number of correlation filters may need to be initialize, updated, and/or applied for the object tracking. In various embodiments, the batch manager 110 may manage batched processing of any combination of this various data in the object tracking system 100, in order to allow for effective and efficient parallelization of processing by the object trackers 106. For example, one or more of the object localizer 112, the filter initializer 114, or the filter updater 116 of the object trackers 106 for different objects may be parallelized using batched processing.

Examples of Batch Processing

Figure 3:
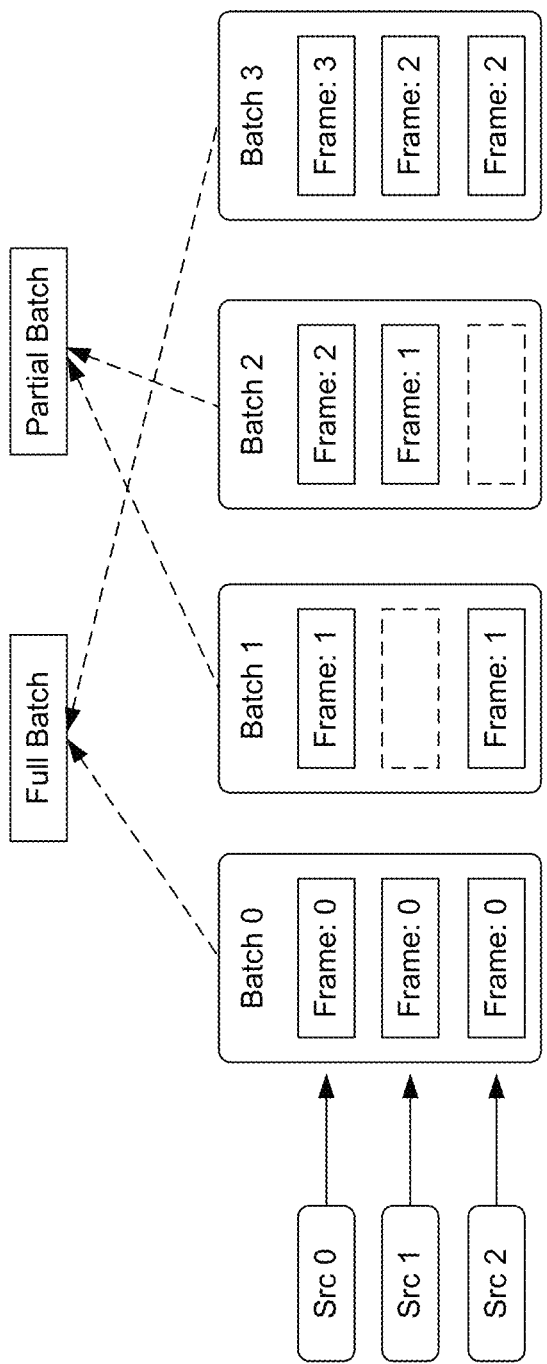
FIG. 3 is a diagram illustrating an example of batching, which may be used to implement multi-object tracking, in accordance with some embodiments of the present disclosure.

In various examples, the batch manager 110 may be used to extract image areas from a batch of one or more images. Referring now to FIG. 3, FIG. 3 is a diagram illustrating an example of batching, which may be used to implement multi-object tracking, in accordance with some embodiments of the present disclosure. In some examples, the batch manager 110 may use the approach of FIG. 3 separately for the object localizer 112 of the object trackers 106, the filter initializer 114 of the object trackers 106, or the filter updater 116 of the object trackers 106 to respectively parallelize processing of those components across objects and/or video streams.

For example, image regions for the filter initializer 114 of the object trackers 106 may be batched and processed, followed by batching and processing of image regions for the object localizer 112 of the object trackers 106, followed by batching and processing of image regions for the filter updater 116 of the object trackers 106. This sequence may repeat for subsequent batched processing. In other examples, batches may be formed from image regions processed by any combination of these components and the processing need not be sequential across each object tracker 106 (e.g., in processing a batch, a filter may be updated for one object tracker 106 while an object is localized for another object tracker 106).

FIG. 3 shows batches 0, 1, 2 and 3, which may be generated by the batch manager 110, and which each may include one or more images and/or frames. In the example shown, the batch manager 110 forms each batch from a plurality of sources, for example, Src 0, Src 1, Src 2. Each source may correspond to a video stream, a sensor 102, a video camera, a video feed, a multi-object tracker, and/or a tracked object and may provide a number of images (e.g., frames) to the batch manager 110. In the example shown, each source corresponds to a respective video stream from a respective video camera and provides a sequence of frames (e.g., as they are generated and/or available). For example, Src 0 may correspond to the video stream of FIG. 2 and Src 1 and Src 2 may correspond to other video streams.

The batch manager 110 may generate each batch, for example, based at least on when the image data is received from a corresponding source. For example, the batch manager 110 may batch frames that are received within a time window (or prior to expiration of a time window in some examples). Thus, frame 0 from Src 0, frame 0 from Src 1, and frame 0 from Src 2 may each be received within the time window for the batch 0. The time window for each batch may be the same or different. In some examples, the time windows are configured such that the object tracking system 100 has completed processing of a previous batch. For example, where time windows are dynamic, endpoints of the time windows may be based at least on completion of processing for a previous batch and/or of one or more intermediate processing steps of a processing pipeline for the previous batch.

The batch manager 110 may operate using a maximum batch size, which may be based on, for example, a number of frames (e.g., one per source), a number of sources, and/or a number of image areas that are to be extracted and/or processed from the batch. For example, the image areas that are to be extracted for a video stream and/or frame may correspond to the number of locations that are to be processed using the object localizer 112, the filter initializer 114 and/or the filter updater 116 of the object tracker(s) 106. A frame may be excluded from a batch, for example, if inclusion of the frame's image areas would cause the number of image areas processed for that batch to exceed a threshold value (e.g., which may be limited based on available memory size).

The maximum batch size may be the same or different for different batches. As shown, batch 0 may be a full batch, as each source has provided a frame within the time window. However, batch 1 is partial batch because the Src 1 has not provided a frame prior to expiration of the time window for the batch. Batch 2 is also a partial batch because Src 2 has not provided a frame prior to expiration of the time window for the batch. Batch 3 is again a full batch as each source has a frame available for processing within the time window. The batch manager 110 may process each frame it receives from a source or may drop one or more frames, such as to maintain real-time object tracking.

Figure 4:
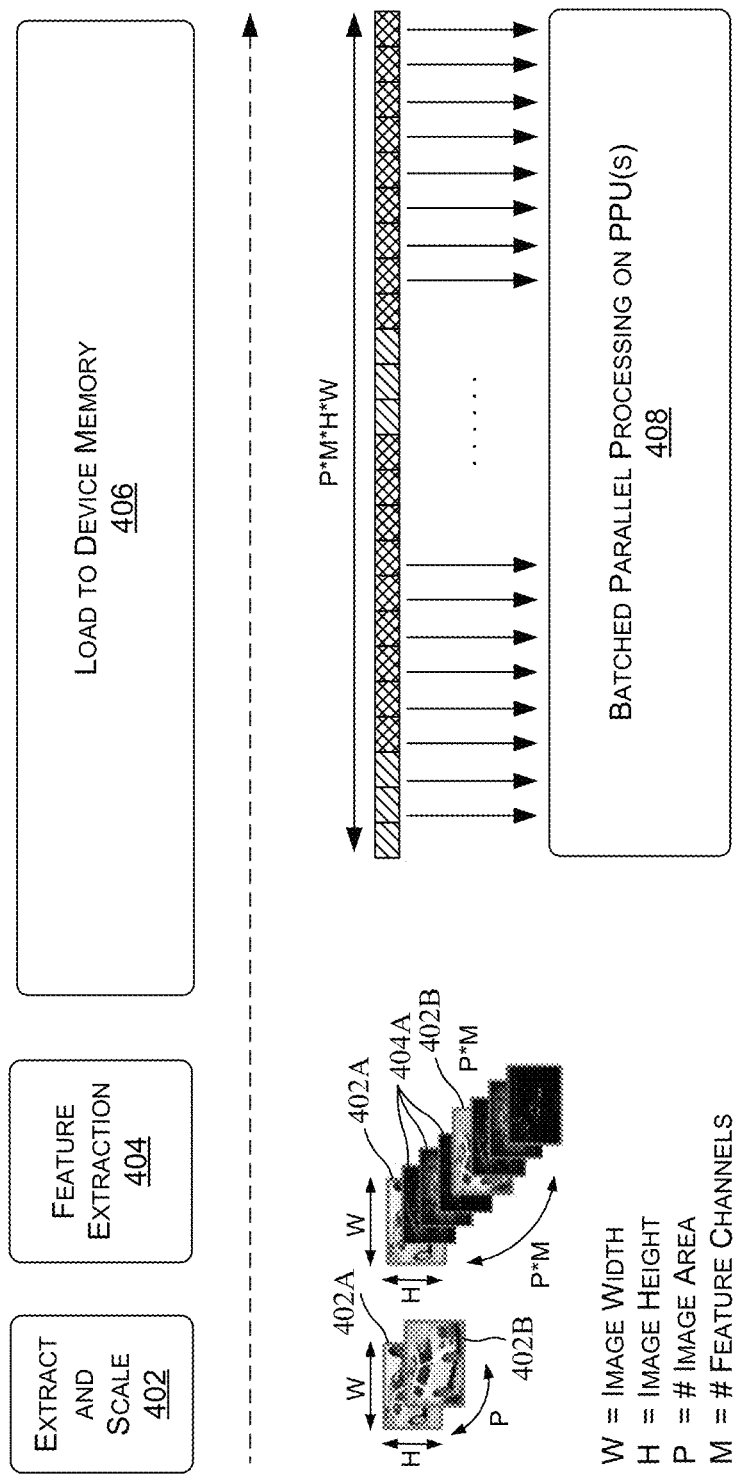
FIG. 4 is a diagram illustrating an example of processing a batch of one or more images, in accordance with some embodiments of the present disclosure.

In addition to forming batches of one or more images, the batch manager 110 may manage processing of each batch. Referring now to FIG. 4, FIG. 4 is a diagram illustrating an example of processing a batch of one or more images, in accordance with some embodiments of the present disclosure. At 402, processing of a batch may include extracting, from the batch of one or more images, a batch of the image areas, and scaling the extracted image areas to one or more template sizes. Extracting an image area from an image may include cropping the image area from the image and the cropped image data may be scaled to a template size. The batch manager 110 may receive a list of bounding boxes, and for each bounding box determine a corresponding image area to extract and scale. Cropped and scaled image areas may be arranged (e.g., contiguously) in texture memory (e.g., texture cache memory) and may belong to a texture object or reference. The arrangement of scaled image areas may be based at least on mapping bounding box indices from the list of bounding boxes to coordinates of one or more grids in a memory grid. Cropping and scaling may use normalized coordinates, bilinear interpolation, and image boundary handling that may be provided by texture memory hardware. The image areas and/or scaled image areas may be in any suitable color format, such as NV12. While bounding boxes are described herein, bounding boxes may more generally be referred to as bounding shapes.

FIG. 4 shows an example of scaled image areas 402A and 402B, which the batch manager 110 may cause storage of to a texture that may be belong to a texture object. In the example shown, a single template size is used, which has a width W and a height H. For P image areas (or objects), a least W×H×P pixels of texture memory (e.g., Compute Unified Device Architecture texture memory) may be needed for storage. However, any number of template sizes may be used for one or more image areas. While the image areas may be of various shapes and sizes in the image(s) from which they are extracted, the scaled image areas 402A and 402B shown are each of the template size (which in some examples may be selected and/or configured to be less than or equal to the size of each of the image area associated with the template size). In some embodiments, using texture memory for processing a batch allows for free scaling using hardware interpolation and free image boundary handling (e.g., image areas that fall partially outside of an image boundary may be filled).

In embodiments where the object localizer 112, the filter initializer 114 and/or the filter updater 116 of the object trackers 106 analyze image features, at 404, one or more feature channels of the image areas may be generated from one or more of the scaled image areas. For example, the batch manager 110 may cause each scaled image area to be analyzed in parallel through processing of the texture object to generate one or more corresponding feature channels. FIG. 4 shows three feature channels are used for the image areas, by way of example. Thus, three feature areas 404A may be generated from the scaled image area 402A. The batch manager 110 may cause the texture comprising the scaled image areas 402A and 402B to be processed in parallel, to produce an image (e.g., in a new or the existing texture) that may include at least a feature area for each feature channel and scaled image area. In examples, each feature area for a scaled image area may be of the same size as the template size of the scaled image area, or may be a different template size. For M feature channels, at least M×W×H×P pixels of texture memory may be needed for storage. In some embodiments, batched feature extraction may be performed using a stacked composite image in texture memory. A feature image may be generated in memory for each feature channel with feature areas arranged based at least on mapping scaled image area indices from the stacked composite image to coordinates of one or more grids in a memory grid of the memory.

At 406, the batch manager 110 may load the texture(s) from texture memory to device memory. For example, the texture memory may be off-chip and the device memory may be on-chip. The device memory may be of one or more Parallel Processing Units (PPUs), such as one or more GPUs. In various embodiments, the PPUs may, for example, correspond to one or more of the GPUs 1508, the GPU(s) 1520, the GPUs 1584, the GPU(s) 1608, and/or the logic unit(s) 1620, described herein. In some embodiments, loading of the textures may be performed by one or more CPUs, such as the CPU(s) 1506, the CPU(s) 1518, the CPU(s) 1580, and/or the CPU(s) 1606. Loading the texture(s) into device memory may further include rearranging one or more of the scaled image areas and/or feature areas. For example, the features areas may be arranged by scaled image area (e.g., object) in copying over the data to the device memory. In some examples, the device memory may be pre-allocated based at least on a maximum number of objects and/or image areas per video stream and/or batch. PPU kernels may be run only on used memory blocks. In some examples, a memory block(s) may be reserved for each tracked object and/or object tracker 106, and used batch to batch. When the tracker terminator 126 terminates tracking for an object, that reserved memory may be freed up and available for an object and/or object tracker 106 that is instantiated by the tracker instantiator 124. Thus, pre-allocated memory may be reused across batches allowing for efficient and low overheard memory management. The memory may further be allocated contiguously for efficient batch processing. A feature area correspond to various types of visual image features. As examples, a feature area may correspond to a gray-scaled representation of an image area, a Histogram of Oriented Gradients (HOG), ColorNames, etc.

At 408, the scaled image areas and the extracted feature areas may be processed by the PPU(s). For example, worker threads may operate on one or more scaled image areas and/or associated feature areas in parallel to carry out functionality of any combination of the object localizer 112, the filter initializer 114, and/or the filter updater 116 of the object trackers 106. This may result in inputs used for generating and/or processing subsequent batches of image areas. As a result of batching and scaling image areas, sizes and shapes of the scaled image areas—as well as correlation filters and correlation responses in correlation filter-based approaches—may be made more homogenous. This may reduce storage sizes and improve processing efficiency, while allowing for the image areas to be analyzed and processed efficiently and effectively in parallel, such as using threads of one or more Graphics Processing Units (GPUs).

Figure 5:
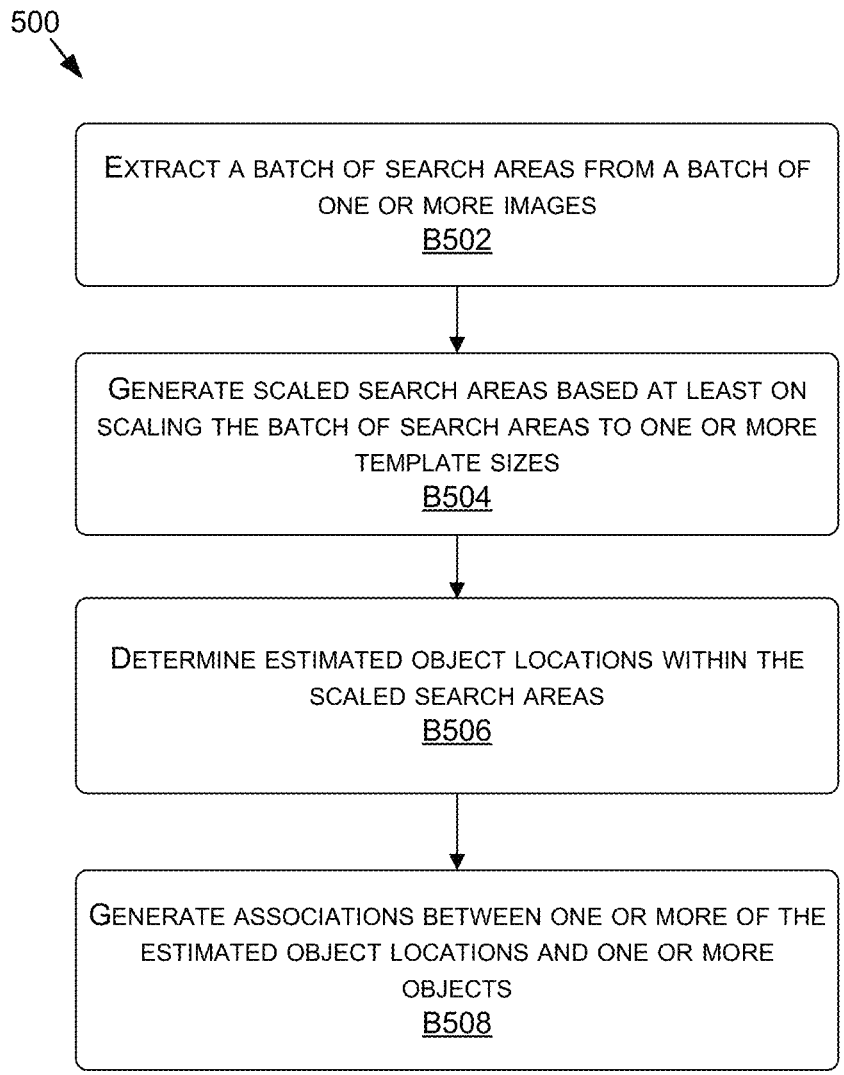
FIG. 5 is a flow diagram showing a method for batch processing search regions of object trackers to determine estimated object locations, in accordance with some embodiments of the present disclosure.

Now referring to FIG. 5, each block of method 500, and other methods described herein, comprises a computing process that may be performed using any combination of hardware, firmware, and/or software. For instance, various functions may be carried out by a processor executing instructions stored in memory. The method(s) may also be embodied as computer-usable instructions stored on computer storage media. The method(s) may be provided by a standalone application, a service or hosted service (standalone or in combination with another hosted service), or a plug-in to another product, to name a few. In addition, method(s) is described, by way of example, with respect to the system of FIG. 1. However, the method(s) may additionally or alternatively be executed by any one system, or any combination of systems, including, but not limited to, those described herein.

FIG. 5 is a flow diagram showing a method 500 for batch processing search regions of object trackers to determine estimated object locations, in accordance with some embodiments of the present disclosure. The method 500 at block B502 includes extracting a batch of search regions from a batch of one or more images. For example, the batch manager 110 may cause extraction, from image data representing a batch of one or more images of one or more videos (e.g., batch 0, 1, or 2 of FIG. 3), image data representing a batch of search regions that correspond to detected locations of objects (e.g., the detected locations 202, 206, 210, and/or 214 of one or more of the objects 160, 208, 212, or 216 of FIG. 2) in one or more images of the one or more videos.

The method 500 at block B504 includes generating scaled search regions based at least on scaling the batch of search regions to one or more template sizes. For example, the batch manager 110 may cause generation, from the image data representing the batch of image areas, image data representing scaled search regions that are of a template size (e.g., the scaled image areas 402A and 402B of FIG. 4). The generation may be based at least on scaling the batch of the search regions to one or more template sizes. The batch manager 110 may also cause generation, from the image data representing the scaled search regions, image data representing one or more features of the scaled search regions (e.g., feature areas 404A of the scaled image area 402A in FIG. 4). A feature(s) for a scaled search region may be represented as a feature area(s) that is of the template size of the scaled search region.

The method 500 at block B506 includes determining estimated object locations within the scaled search regions. For example, the batch manager 110 may cause the scaled search regions (and in some embodiments the feature areas) to be loaded in a PPU(s). The object localizer 112 of the object trackers 106 of one or more multi-object trackers of FIG. 1 may determine, from the image data representing the scaled search regions (and from image data representing the feature areas in some embodiments), data representing estimated object locations within the scaled search regions (e.g., the estimated locations 220, 222, 224, and/or 226 of FIG. 2).

The method 500 at block B508 includes generating associations between one or more of the estimated object locations and one or more objects. For example, the data associator(s) 108 may associate one or more of the estimated object locations with one or more previously and/or newly tracked objects and/or trajectories (e.g., using object IDs). In some embodiments, the estimated object locations may be aggregated and/or fused with one or more other locations by the location aggregator 122 prior to being associated with an object (e.g., as described with respect to frame 2 of FIG. 2).

Figure 6:
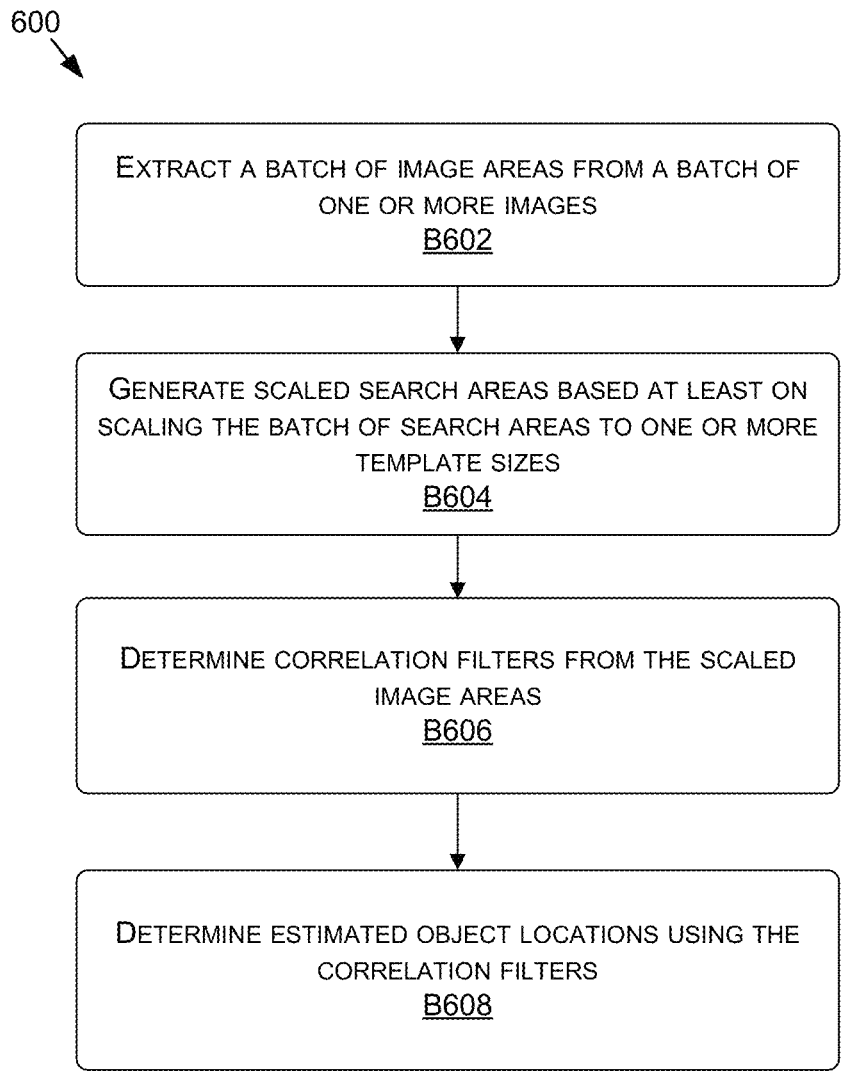
FIG. 6 is a flow diagram showing a method for batch processing image areas of object trackers to initialize or update correlation filters, in accordance with some embodiments of the present disclosure.

FIG. 6 is a flow diagram showing a method 600 for batch processing image areas of object trackers to initialize or update correlation filters, in accordance with some embodiments of the present disclosure. The method 600 at block B602 includes extracting a batch of image areas from a batch of one or more images. For example, the batch manager 110 may cause extraction, from image data representing a batch of one or more images of one or more videos (e.g., batch 0, 1, or 2 of FIG. 3), image data representing a batch of image areas that correspond to detected locations of objects (e.g., the detected locations 202, 206, 210, and/or 214 of one or more of the objects 160, 208, 212, or 216 of FIG. 2) in one or more images of the one or more videos.

The method 600 at block B604 includes generating scaled image areas based at least on scaling the batch of image areas to one or more template sizes. For example, the batch manager 110 may cause generation, from the image data representing the batch of image areas, image data representing scaled image areas that are of a template size (e.g., the scaled image areas 402A and 402B of FIG. 4). The generating may be based at least on scaling the batch of the image areas to one or more template sizes. The batch manager 110 may also cause generation, from the image data representing the scaled image areas, image data representing one or more features of the scaled image areas (e.g., feature areas 404A of the scaled image area 402A in FIG. 4). A feature(s) for a scaled image area may be represented as a feature area(s) that is of the template size of the scaled image area.

The method 600 at block B606 includes determining correlation filters from the scaled image areas. For example, the batch manager 110 may cause the scaled image areas (and in some embodiments the feature areas) to be loaded in a PPU(s). The filter initializer 114 of the object trackers 106 of one or more multi-object trackers of FIG. 1 may determine, from the image data representing the scaled image areas (and from image data representing the feature areas in some embodiments), data representing the correlation filters (which may comprise one or more feature channels in some embodiments). Additionally or alternatively, for one or more of the image areas, the filter updater 116 of the object trackers 106 of one or more multi-object trackers of FIG. 1 may determine, from the image data representing the scaled image areas (and from image data representing the feature areas in some embodiments), data representing updated correlation filters (which may comprise one or more feature channels in some embodiments).

The method 600 at block B608 includes determining one or more estimated object locations using the correlation filters. For example, the object localizer 112 of the object trackers 106 of one or more multi-object trackers of FIG. 1 may determine, from the data representing the correlation filters, data representing one or more estimated object locations (e.g., the estimated locations 220, 222, 224, and/or 216 of FIG. 2).

Figure 7:
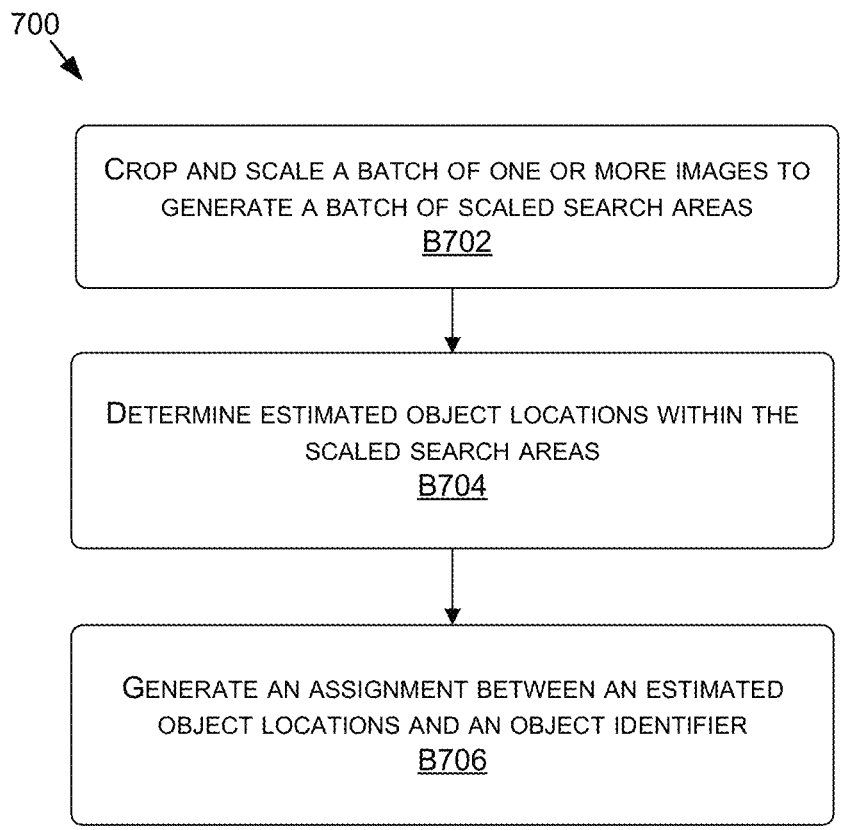
FIG. 7 is a flow diagram showing a method for batched cropping and scaling of search regions of object trackers to determine estimated object locations, in accordance with some embodiments of the present disclosure.

FIG. 7 is a flow diagram showing a method 700 for batched cropping and scaling of search regions of object trackers to determine estimated object locations, in accordance with some embodiments of the present disclosure. The method 700 at block B702 includes cropping and scaling a batch of one or more images to generate a batch of scaled search regions. For example, the batch manager 110 may cause extraction, from image data representing a batch of one or more images of one or more videos (e.g., batch 0, 1, or 2 of FIG. 3), image data representing cropped and scaled search regions that are of one or more template sizes (e.g., the scaled image areas 402A and 402B of FIG. 4). The batch manager 110 may also cause generation, from the image data representing the scaled search regions, image data representing one or more features of the scaled search regions (e.g., feature areas 404A of the scaled image area 402A in FIG. 4). A feature(s) for a scaled search region may be represented as a feature area(s) that is of the template size of the scaled search region.

The method 700 at block B704 includes determining estimated object locations within the scaled search regions. For example, the batch manager 110 may cause the scaled search regions (and in some embodiments the feature areas) to be loaded in a PPU(s). The object localizer 112 of the object trackers 106 of one or more multi-object trackers of FIG. 1 may determine, from the image data representing the scaled search regions (and from image data representing the feature areas in some embodiments), data representing estimated object locations within the scaled search regions (e.g., the estimated locations 220, 222, 224, and/or 226 of FIG. 2).

The method 700 at block B706 includes generating an assignment between one or more of the estimated object locations and one or more object IDs. For example, the data associator(s) 108 may assign one or more of the estimated object locations to object IDs of existing and/or newly tracked objects and/or trajectories (e.g., using object IDs). In some embodiments, the estimated object locations may be aggregated and/or fused with one or more other locations by the location aggregator 122 prior to being assigned to an object ID (e.g., as described with respect to frame 2 of FIG. 2).

Examples of Data Association Using Correlation Response Values

Aspects of the disclosure provide, in part, for data association in object tracking based at least on correlation response values. These approaches may be implemented on by the object tracking system 100 of FIG. 1 or a different object tracking system, which may employ a different object tracking techniques than the object tracking system 100. Disclosed approaches may enable data association to be performed between estimated object locations and one or more other locations based on visual similarity without requiring generation of additional correlation responses and/ or features of the estimated object locations and/or other locations.

Data association may be used to link estimated object locations from object trackers with locations (e.g., detected object locations and/or estimated object locations) within and/or across frames. For example, as described herein, the object matcher 118 of FIG. 1 may match locations for object tracking. Also described herein, in various embodiments, a correlation filter may be applied to an image area to determine an estimated object location (e.g., the estimated location 230 of FIG. 2). For example, the object localizer 112 may apply a correlation filter to a search region to determine the estimated object location. As a result, a correlation response (which may include one or more channels, one or more of which may include feature channels) for the estimated object location may have been generated. Embodiments of the disclosure may enable this correlation response to be reused in data association. For example, the correlation response may be located in memory when used to determine the estimated object location, and the correlation response may be looked up in the memory (e.g., at the same location used for localization) for use in data association. Thus, the estimated object location may be associated with one or more other locations using the correlation response already computed for localization, and additional correlation responses and/or visual features need not be generated for carrying out the data association (although they may be in some embodiments).

In accordance with disclosed approaches, a value(s) of a correlation response of an estimated object location that corresponds to another location (e.g., of a detected bounding box) may be used to compare the other location to the estimated object location. Based at least on the value(s) of the correlation response (e.g., a single value or aggregate of values in an area and/or of correlation response channels), the other location may or may not be associated with the estimated object location. In some embodiments, this comparison may further be based at least on a value(s) of the correlation response that corresponds to the estimated object location (e.g., a single value or aggregate of values in an area and/or of correlation response channels). For example, the comparison may comprise determining a ratio between the value(s) associated with the other location and the value(s) associated with the estimated object location. Using this approach for different correlation responses and locations may act to normalize this factor in comparing different locations.

In various examples, the value(s) of the correlation response for the estimated object location may be based at least on a peak correlation response value of the correlation response (and/or a value or values used by the object localizer 112 to select the estimated object location). In some examples, the peak correlation response value may be at the center of a bounding box corresponding to the estimated object location. The value(s) of the correlation response for the other location may be based at least on a correlation response value(s) of the correlation response at the other location, such as at the center of or otherwise within a bounding box corresponding to the location.

In various examples, the comparison between the values may be used to compute a confidence value that quantifies a level of similarity between the locations and/or a likelihood the locations correspond to a same object. Confidence values (which may also be referred to as confidence scores) between different locations may be used to associate locations with one another. For example, any suitable matching algorithm may be used to match locations (e.g., estimated object locations to detected object locations) based at least on the confidence values. Examples of suitable matching algorithms include global matching algorithms, greedy algorithms or non-greedy algorithms, such as those using the Hungarian method. For example, a bipartite graph may be formed that links the locations (e.g., a set of estimated object locations and a set of detected object locations) with weights corresponding to the confidence values. The bipartite graph may be formed, for example, by minimizing the costs between the location nodes. Associations between locations may then correspond to the linked nodes. Additionally or alternatively, in some embodiments, locations may be associated with one another based at least on a corresponding confidence value exceeding a threshold value.

Confidence scores used to associate locations may be based on other factors in addition to or instead of correlation response values. For example, a confidence value for locations may be based at least on an Intersection of Union (IoU) between the locations (e.g., between bounding boxes). In some examples, a confidence score for locations may be based at least on spatio-temporal data. For example, an estimated object location may be computed from a previous location of an object (e.g., in a prior frame). An aggregate of the locations being compared (e.g., between bounding boxes) may be computed by the location aggregator 122 and may be compared to the previous location as a factor in computing a confidence scores. In some embodiments, the confidence scores may be based at least on an IoU between the aggregate of the locations and the previous location (e.g., between bounding boxes). A lower IoU may correspond to a higher confidence score. Another factor for a confidence score that may be based at least on a velocity between the aggregate of the locations and the previous location. The velocity may be computed based on a distance between bounding boxes and/or based on measured or inferred speed information. A lower velocity may correspond to a higher confidence score. While various factors are described as being used to compute the confidence score, additional or alternatively, any of these factors may be used a threshold to prevent matches when corresponding values exceed a threshold value (e.g., when the velocity is greater than a threshold value).

In one or more embodiments, during a first phase a correlation filter may be determined by the filter initializer 114 or the filter updater 116, then the correlation filter may be applied by the object localizer 112 in the next frame to get a correlation response. The peak correlation response may correspond to the estimated location of the tracked object, which is localized and applied to the next frame.

A correlation response produced by a correlation filter may cover an entire search region. If a detected location from the object detector 104 (e.g., bounding box) used for data association is in the search region, then instead of extracting a new feature from the detected location, a correlation response value associated with the detected location (e.g., a center of the bounding box) can be used instead. The correlation response value may be based on the correlation filter that was learned for the tracked object and may indicate a confidence level from the point of view of the object tracker 106. There could be multiple correlation values corresponding to the same detected location (e.g., bounding box) if there are multiple object trackers 106 whose search regions include the same detected location.

Figure 8:
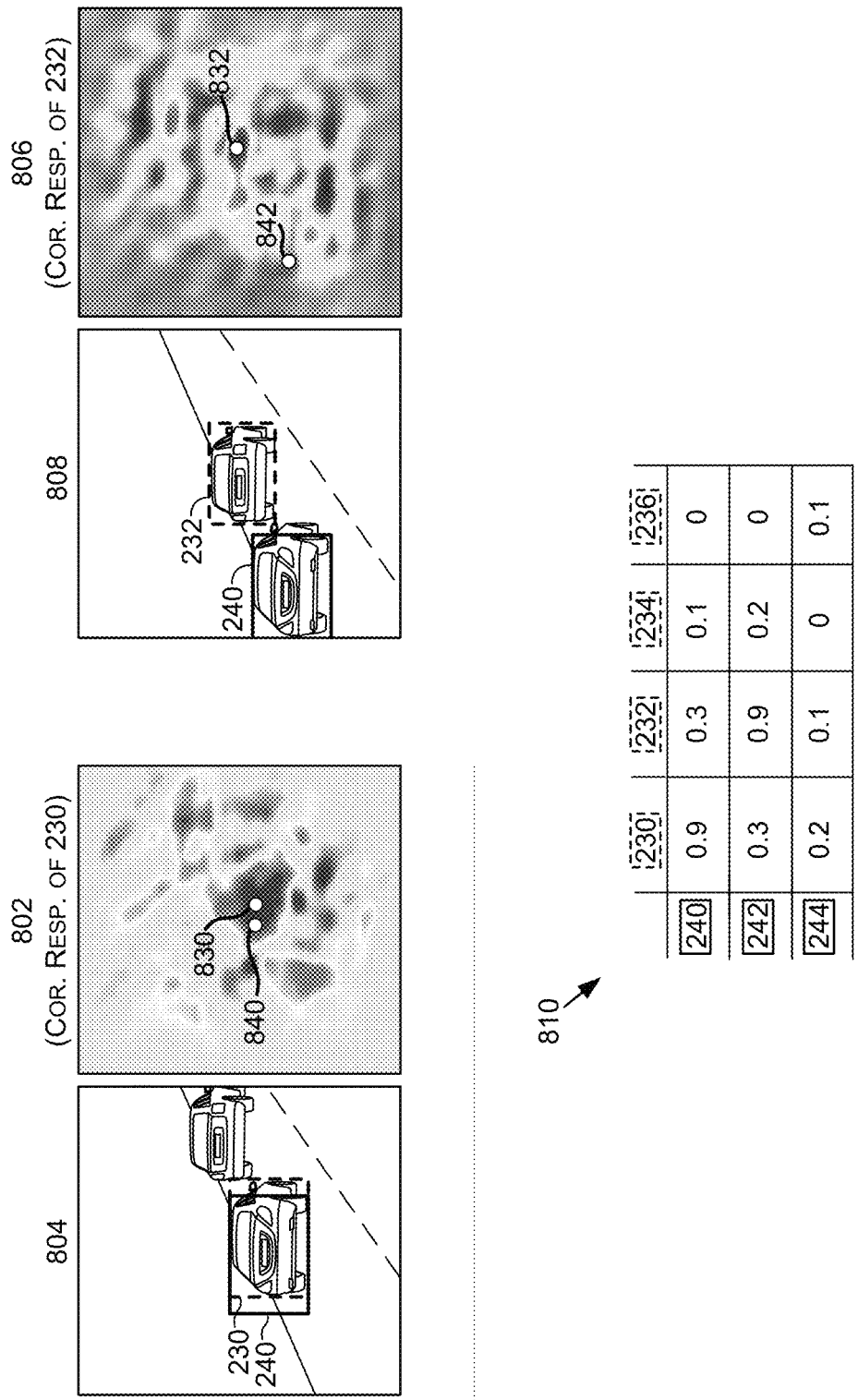
FIG. 8 is a diagram illustrating an example of associating locations based on correlation response values, in accordance with some embodiments of the present disclosure.

Referring now to FIG. 8, FIG. 8 is a diagram illustrating an example of associating locations based on correlation response values, in accordance with some embodiments of the present disclosure. FIG. 8 is described with respect to data association between estimated object locations and detected object locations by way of example. However, the locations that are compared may generally be any locations associated with objects.

The example of FIG. 8 shows a correlation response 802 of the estimated location 230 of FIG. 2 and an image area 804 (not shown as scaled although it may be) which may be used to generate the correlation response 802. FIG. 8 also shows a correlation response 806 of the estimated location 232 of FIG. 2 and an image area 808 (not shown as scaled although it may be) which may be used to generate the correlation response 806. The object matcher 118 of the data associator(s) 108 may use the correlation responses 802 and 806, as well as correlation responses of the estimated locations 234 and 236 in FIG. 2 to compute confidence scores between one or more of the estimated locations 230, 232, 234, or 236 and one or more of the detected locations 240, 242, or 244 in order to match or otherwise form associations between the locations.

As described herein, these confidence scores may be based at least on values of the correlation responses (e.g., used by the object localizer 112 to determine the estimated locations). For example, a table 810 is shown in which each cell represents a confidence score between a respective estimated location and detected location. The confidence score of 0.9 may be computed based at least on values 840 and 830 of the correlation response 802. The value 830 may be at a center of a bounding box of the estimated location 230 and/or may be a peak correlation response value. The value 840 may be at a center of a bounding box of the detected location 240 or otherwise may correspond to the detected location 240. The values may be single values from one or more channels of the correlation response or a combination (e.g., statistical) of values therefrom. In some examples, the values may be derived (e.g., statistically) from values in an area of one or more of the channels, such as within the corresponding bounding box. As the values 830 and 840 are similar, the ratio between the values may be high resulting in a high confidence score.

Similarly, the confidence score of 0.3 may be computed based at least on values 842 and 832 of the correlation response 802. The value 832 may be at a center of a bounding box of the estimated location 232 and/or may be a peak correlation response value. The value 842 may be at a center of a bounding box of the detected location 240 or otherwise may correspond to the detected location 240. As the values 832 and 842 are less similar than the values 830 and 840, the ratio between the values may be lower resulting in a lower confidence score. As such, the detected location 240 may be matched to the estimated location 230 rather than to the estimated location 0.3. Confidence scores may similarly be computed between each combination of detected location and estimated location and the object matcher 118 may use these confidence scores for object matching, as described herein (e.g., using Hungarian matching with a bipartite graph or a greedy matching algorithm). In some embodiments, the confidence scores may be computed without extracting visual features from the detected locations 240, 242, and 244 of the frame 2, thereby reducing computations and storage needed for data association.

Figure 9:
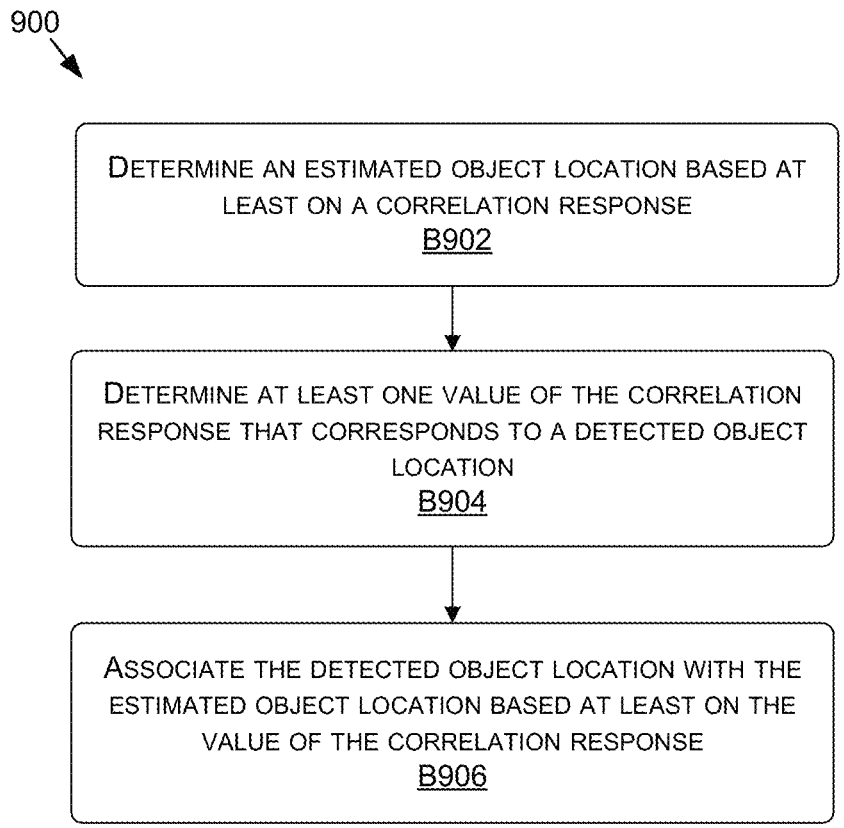
FIG. 9 is a flow diagram showing a method for associating locations based at least on correlation response values, in accordance with some embodiments of the present disclosure.

Referring now to FIG. 9, FIG. 9 is a flow diagram showing a method 900 for associating locations based at least on correlation response values, in accordance with some embodiments of the present disclosure. The method 900 at block B902 includes determining an estimated object location based at least on a correlation response. For example, the object localizer 112 of the object tracker 106 may determine the estimated location 230 based at least on the correlation response 802 of a correlation filter generated using the filter initializer 114 and/or the filter updater 116.

The method 900 at block B904 includes determining at least one value of the correlation response that corresponds to a detected object location. For example, the object matcher 118 may determine the value 840 of the correlation response 802 that corresponds to the detected location 240.

The method 900 at block B906 includes associating the detected object location with the estimate object location based at least one the value of the correlation response. For example, the object matcher 118 may compute a confidence score (e.g., 0.9 in FIG. 8) using the at least one value, and associate the detected location 240 with the estimated location 230 based at least on the confidence score. The location aggregator may aggregate the estimated location 230 and the detected location 240 based on the association and the aggregated location may be assigned to the object ID associate with the object tracker 106 for the frame 2.

Examples of Learning Correlation Filters Using Focused Windowing

Aspects of the disclosure provide, in part, for learning correlation filters in object tracking based at least on focused windowing. These approaches may be implemented on by the object tracking system 100 of FIG. 1 or a different object tracking system, which may employ a different object tracking techniques than the object tracking system 100. Disclosed approaches may enable a correlation filter to be learned while focusing on a target area without requiring target segmentation and without excluding a background from training.

As described herein, the filter initializer 114 and/or the filter updater 116 may learn a correlation filter that produces a correlation response based on a target in an image area. The object localizer 112 may use the correlation filter to localize the target in a search region based at least on the correlation response, which may correspond to an estimated object location. The size of a search region may present certain trade-offs. A large search region may allow for an object tracker 106 to track an object target even with large displacement between frames. However, a correlation filter learned from using large search region would include more background. This may result in the filter inadvertently and undesirably learning to detect and/or track the background instead of the target object. Conversely, when using smaller search regions, less background is learned, at the cost of an increase in the frequency of track failures when tracked objects experience a large displacement over consecutive frames.

One conventional approach segments a target object from an image and uses the segmented target to exclude the background when training a correlation filter. This approach may work equally well for a large or small search region as the background is excluded from learning. However, this approach is also not without issues. For example, to make the segmentation work well, a sophisticated segmentation algorithm is required. Object segmentation itself is typically a compute-heavy task and so the conventional approach uses an efficient/simple segmentation algorithm to fit within computational budgets. In particular, the conventional approach uses a Markov Random Field (MRF) on color likelihood for segmentation. This may compromise the quality of the segmentation resulting in portions of the target object being excluded from learning or portions of the background being included in learning. Additionally, even with a high quality segmentation, learning only from the target object may produce larger false positives, especially when the background is cluttered or has similar color components.

Additional aspects of the disclosure provide for learning correlation filters in object tracking based at least on focused windowing. When learning a correlation filter from an image area, a focused window may be applied to the image area that blurs the background of a target object with the blur increasing based on distance from the target. Applying a focused window to an image may refer to applying the focused window to one or more channels of the image, such as one or more color channels or feature channels extracted from the image (e.g., from one or more of the color channels). Embodiments of focused windowing may be viewed as a rough, approximated target segmentation.

Figure 10:
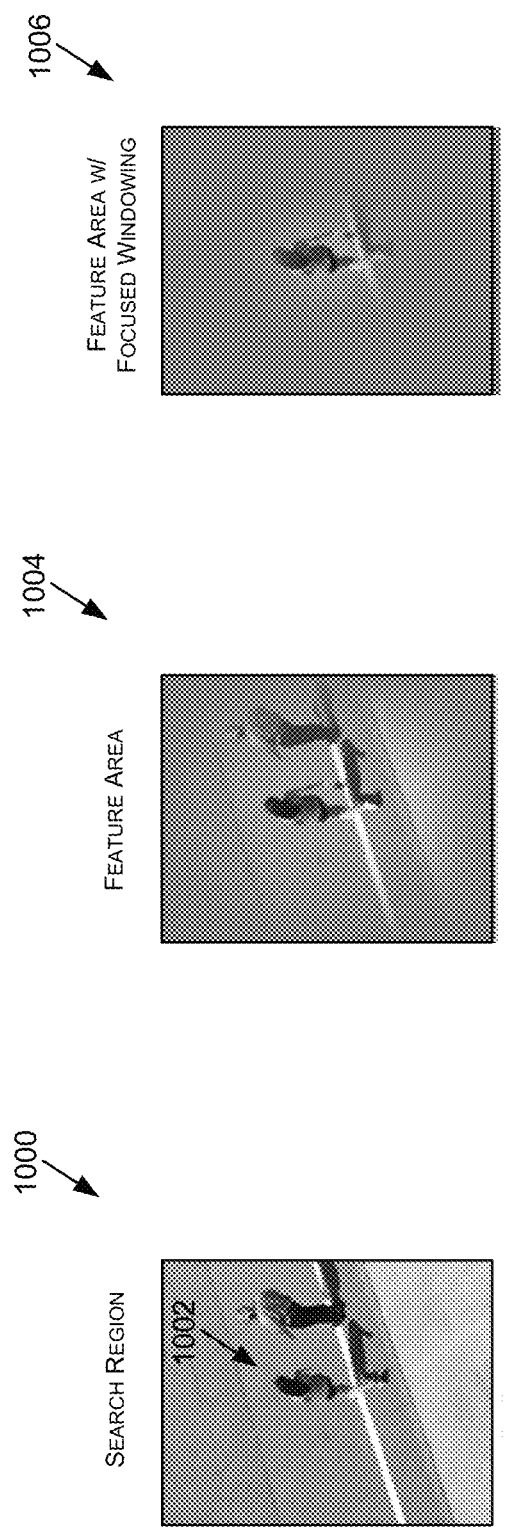
FIG. 10 is a diagram illustrating an example of applying focused windowing to an image to learn a correlation filter using focused windowing, in accordance with some embodiments of the present disclosure.

Referring now to FIG. 10, FIG. 10 is a diagram illustrating an example of applying focused windowing to an image to learn a correlation filter using focused windowing, in accordance with some embodiments of the present disclosure. FIG. 10 shows a search region 1000 which may be used to learn a correlation filter for a target object 1002. FIG. 10 also shows a feature area 1004 which may be a feature channel of the search region 1000 that is extracted from the search region 1000. In this example, focused windowing may be applied to at least the feature area 1004 resulting in a focused feature area 1006. The focused windowing may similarly be applied to one or more other channels of the search region 1000. As can be seen, the focused feature area 1006 reduces learning from the background while still allowing the background to provide learning of context around the target object. Thus, the search region 1000 may be made larger without risking overlearning of the background.

In some embodiments, focused windowing may be applied to each image area using a blur filter, such as a Gaussian filter. The blur filter may be configured to increase blur based on pixel distance from the target object (e.g., estimated object location) and/or a center of the image area. In some embodiments, a same blur filter with a same set of blur parameters may be applied to each image area to learn a correlation filter from that area. In other embodiments, blur parameters of a blur filter may be dynamically adjusted, such as based on image area properties. For example, a size of the blur filter may be adjusted based at least on a size of an image area (e.g., to cover the entire area). Additionally or alternative, a width, height, slope speed and/or other dimension or property of an impulse response of the blur filter may be adjusted based at least on a size of the image area and/or target object. While segmentation of the target object need not be performed, in some embodiments a segmentation of the target object and/or bounding box detection may be derived from the image area and used to determine and/or adjust one or more parameters of the blur filter (e.g., one or more dimensions of the impulse response).

Figure 11:
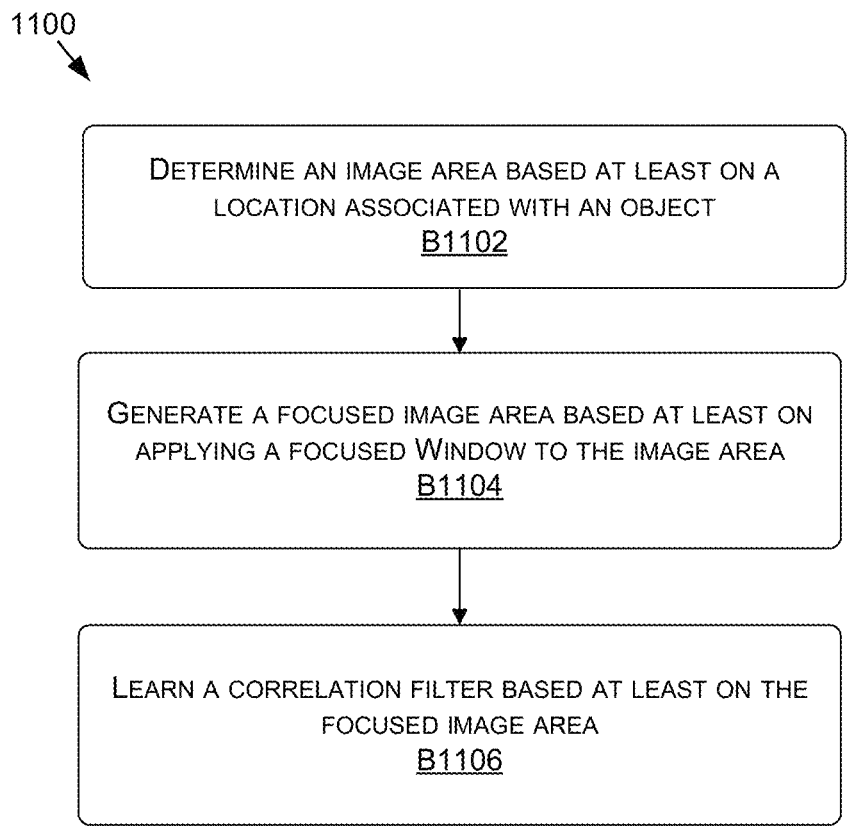
FIG. 11 is a flow diagram showing a method for applying focused windowing to an image to learn a correlation filter using focused windowing, in accordance with some embodiments of the present disclosure.

Referring now to FIG. 11, FIG. 11 is a flow diagram showing a method 1100 for applying focused windowing to an image to learn a correlation filter using focused windowing, in accordance with some embodiments of the present disclosure. The method 1100 at block B1102 includes determining an image area based at least on a location associated with an object. For example, the filter initializer 114 or the filter updater 116 may determine the search region 1000 of FIG. 10 based at least on a detected object location from the object detector 104, an estimated object location from the object localizer 112, and/or an aggregated location from the location aggregator 122 that is associated with the target object 1002.

At block B1104 the method 1100 includes generating a focused image area based at least on applying the focused window to the image area. For example, the filter initializer 114 or the filter updater 116 may apply focused windowing to one or more channels of the search region 1000 of FIG. 10 to generate a focused image area that include focused windowing in one or more channels. The focused feature area 1006 is an example of a feature channel of the focused image area corresponding to the search region 1000.

At block B1106, the method 1100 includes learning a correlation filter based at least on the focused image area. For example, the filter initializer 114 or the filter updater 116 may learn a correlation filter for the target object 1002 from at least the focused feature area 1006 and/or other channels of the focused image area generated from the search region 1000, which may or may not include focused windowing. In some examples, the correlation filter is a multi-channel correlation filter, and each channel may be learned from one or more corresponding channels of the focused image area (e.g., a Histogram of Oriented Gradients channel of the correlation filter may be learned from a Histogram of Oriented Gradients channel of the focused image area). In various embodiments, channel weights for the correlation filter may be computed with a per-channel contribution to the correlation response.

Examples of Learning Correlation Filters Using Occlusion Maps

The disclosure further provides for learning correlation filters in object tracking based at least on occlusion maps. These approaches may be implemented on by the object tracking system 100 of FIG. 1 or a different object tracking system, which may employ a different object tracking techniques than the object tracking system 100. Disclosed approaches may enable a correlation filter to be learned while reducing and/or eliminating learning from occlusions.

Conventional approaches to learning correlation filters for target objects are unable to account for which pixels are part of the target object and which are part of occlusions. When there are partial/full occlusions to the target object, such approaches increase the risk of including the background into the target modeling/learning even with a segmentation or focused windowing applied.

In accordance with aspects of the disclosure, when learning a correlation filter from an image area, an occlusion map may be applied to the image area that masks, excludes, and/or blurs occlusions of the target object. The correlation filter may be learned from the modified image, thereby reducing or eliminating learning from occlusions while still allowing for learning from exposed portions the target object. For example, an occlusion map may be used to detect partial occlusions, and to exclude those pixels when updating models using a moving average, such as using Equation (1), or other temporal learning algorithm. Pixels in a target object region and pixels in background regions of the target object have different characteristics, but a moving average scheme treats them equally. In proposed approaches, a background learned by a GMM background may be directly used as the learned target model, meaning that the target pixel values may be estimated from the GMM, taking into account the variance of the pixel values.

Some embodiments may include using an adaptive GMM history to train the GMM based on target object state. When the target object state is stable (e.g., non-occluded), the target objects appearance may be relatively static, resulting in high peak correlation responses without much variation in strength. Accordingly, the GMM history may be set high for learning purposes. When the target object state is partially occluded, this may result in a lower peak correlation response, potentially with higher side-lobes (for a short amount of time). Once again, the GMM history may be set high, but possibly not used to update the target appearance model. When the target state includes rapid changes, this may result in a lower correlation peak (for a longer amount of time). Under these circumstances, the GMM history may be set low to adopt the latest changes quickly.

Figure 12A:
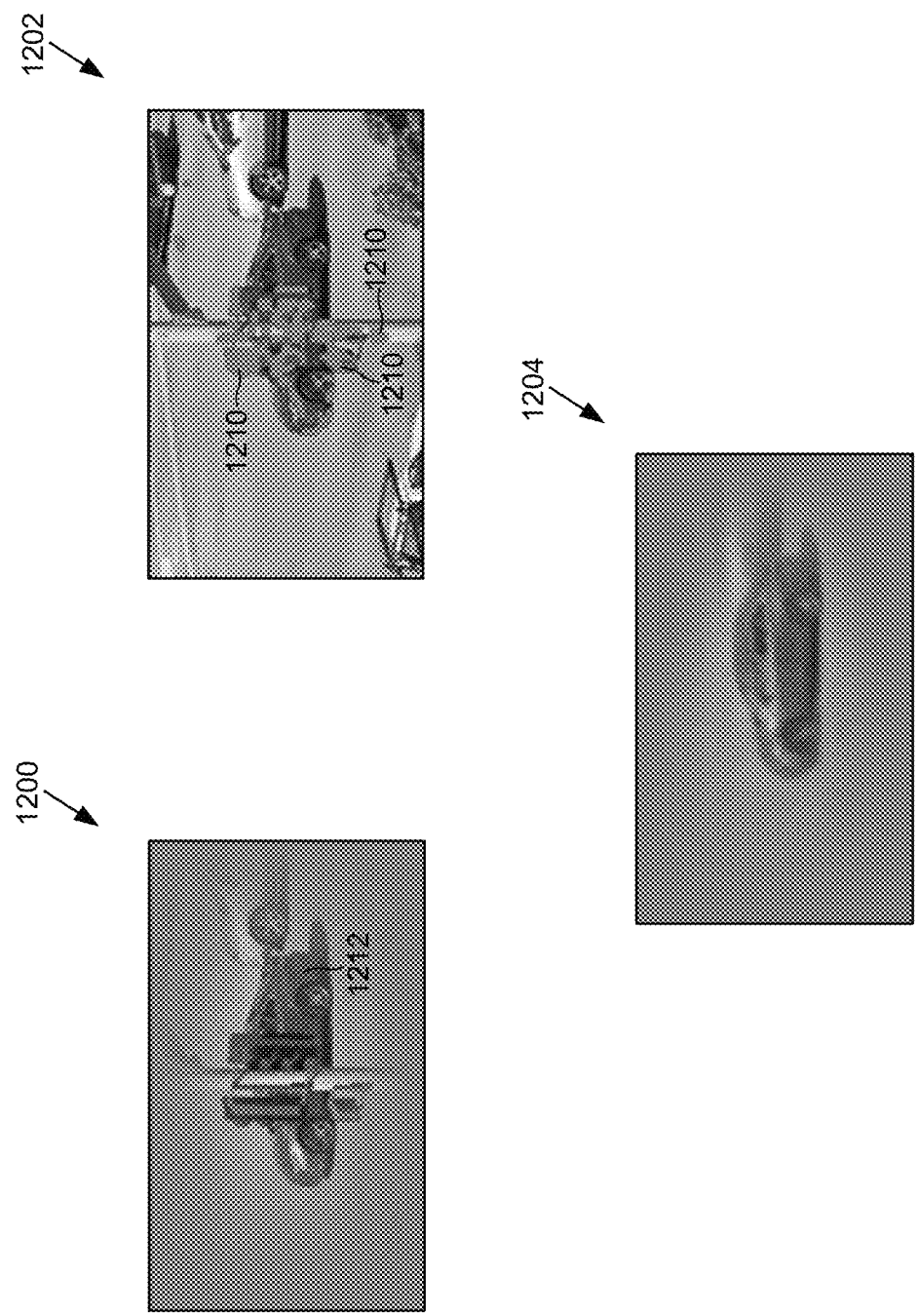
FIG. 12A is a diagram illustrating examples of an image, an occlusion map of the image, and a target model of a correlation filter learned using the image and the occlusion map, in accordance with some embodiments of the present disclosure.
Figure 12B:
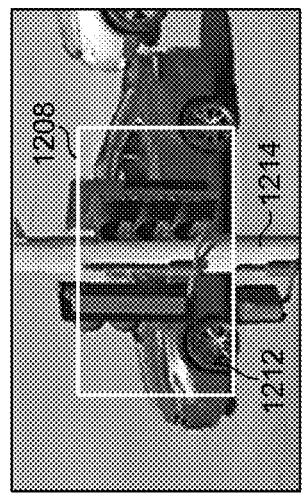
FIG. 12B is a diagram illustrating examples of a correlation response of the correlation filter of FIG. 12A, and an estimated object location determined using the correlation filter, in accordance with some embodiments of the present disclosure.

Referring now to FIGS. 12A and 12B, FIG. 12A is a diagram illustrating examples of an image area 1200, an occlusion map 1202 of the image area 1200, and a target model 1204 of a correlation filter learned using the image area 1200 and the occlusion map 1202, in accordance with some embodiments of the present disclosure. FIG. 12B is a diagram illustrating examples of a correlation response 1206 of the correlation filter of FIG. 12A, and an estimated object location 1208 determined using the correlation filter, in accordance with some embodiments of the present disclosure.

The occlusion map 1202 may be generated from the image area 1200, which may be, for example, a search area used by the filter initializer 114 or the filter updater 116 to learn the target model 1204 of the correlation filter. The occlusion map 1202 is shown as having identified occlusion regions 1210. In various examples, the occlusion map 1202 may be applied to the image area 1200 (e.g., one or more channels of the image), such as by masking, blurring, or otherwise adjusting the image area 1200 and/or the correlation filter learning model to reduce or eliminate learning from one or more of the occlusion regions 1210. In various embodiments, the occlusion map 1202 may be used to create a modified version image area 1200, which the filter initializer 114 or the filter updater 116 may use to learn the target model 1204 of the correlation filter. In embodiments where focused windowing is also employed, the image area 1200 may further be modified using focused windowing (before or after adjusting based on the occlusion map 1202). In some examples, the occlusion map 1202 may be represented by output data of a machine learning model trained to generate the occlusion map 1202. The occlusion map 1202 may optionally be further processed and may be applied to the image area 1200 as a mask. For example, one or more of the occlusion regions 1210 may be removed, merged, combined, or otherwise adjusted in applying the occlusion map 1202 to the image area 1200 (e.g., based at least on a distance from a center of the image area 1200 or other location of the target object 1212).

The occlusion map 1202 may be generated using a machine learning model, such as a Gaussian Mixture Model (GMM) or other MLM that is trained over a number of frames (e.g., using the image areas used to learn the correlation filter) using a target object 1212 as a background so that occlusions are detected as foreground. For example, the machine learning model may be trained in parallel with learning the correlation filter for the target object 1212 and from the same source images (e.g., the image area 1200).

An occlusion map be generated each frame and/or based on detection of an occlusion. The proposed approaches may be used to minimize the corruption of the target model 1204 arising from occlusions in the image area 1200. In some embodiments, as long as the occlusion regions 1210 of the target object 1212 are detected, the detection of occlusion regions in the non-target area may be irrelevant, because the pixels in non-target area vary as the target object 1212 moves over a number of frames. Using disclosed approaches, the target model 1204 may remain uncorrupted as the target object 121 moves past an occluder 1214 over a number of frames. As such, the correlation response 1206 may reliably indicate the estimated object location 1208. For examples, as shown, by accounting for the occluder 1214, the shape of the peak of the correlation response may become slightly elongated in a horizontal direction, forming an ellipsoidal shape that follows the target object 1212. In contrast, without accounting for the occluder 1214, the peak of the correlation response may be located on the occluder 1214 at the center of the image, causing an object tracker to get stuck.

Figure 12B:
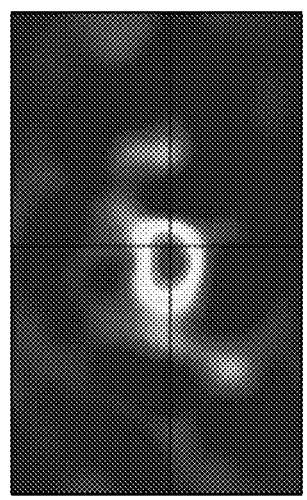
Figure 13:
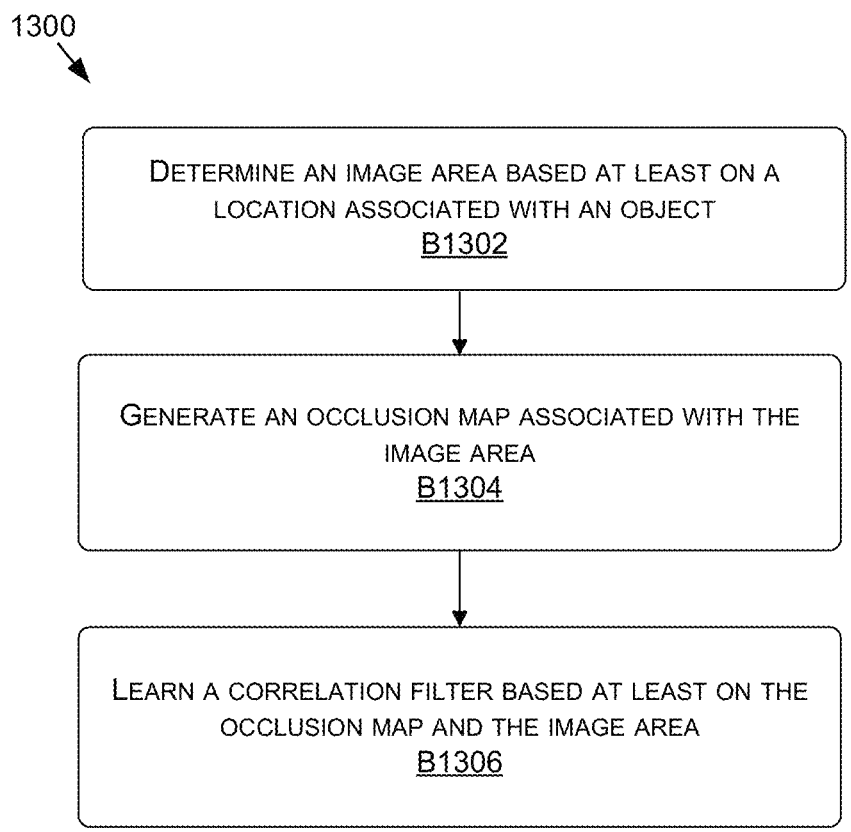
FIG. 13 is a flow diagram showing a method for applying an occlusion map to an image to learn a correlation filter, in accordance with some embodiments of the present disclosure.

Referring now to FIG. 13, FIG. 13 is a flow diagram showing a method 1300 for applying an occlusion map to an image to learn a correlation filter, in accordance with some embodiments of the present disclosure. The method 1300 at block B1302 includes determining an image area based on a location associated with an object. For example, the filter initializer 114 or the filter updater 116 may determine the image area 1200 of FIG. 12 based at least on a detected object location from the object detector 104, an estimated object location from the object localizer 112, and/or an aggregated location from the location aggregator 122 that is associated with the target object 1002.

The method 1300 at block B1304 includes generating an occlusion map associated with the image area. For example, the filter initializer 114 or the filter updater 116 may use a machine learning model, such as a GMM to generate the occlusion map 1202 of FIG. 12.

The method 1300 at block B1306 includes learning a correlation filter based at least on the occlusion map and the image area. For example, the filter initializer 114 or the filter updater 116 may learn the target model 1204 of FIG. 12 from the image area 1200 using the occlusion map 1202 to exclude, remove, and/or discount learning from pixels that correspond to one or more of the occlusion regions 1210.

Examples of Accounting for Multiple Modes Correlation Response Filters

Figure 14:
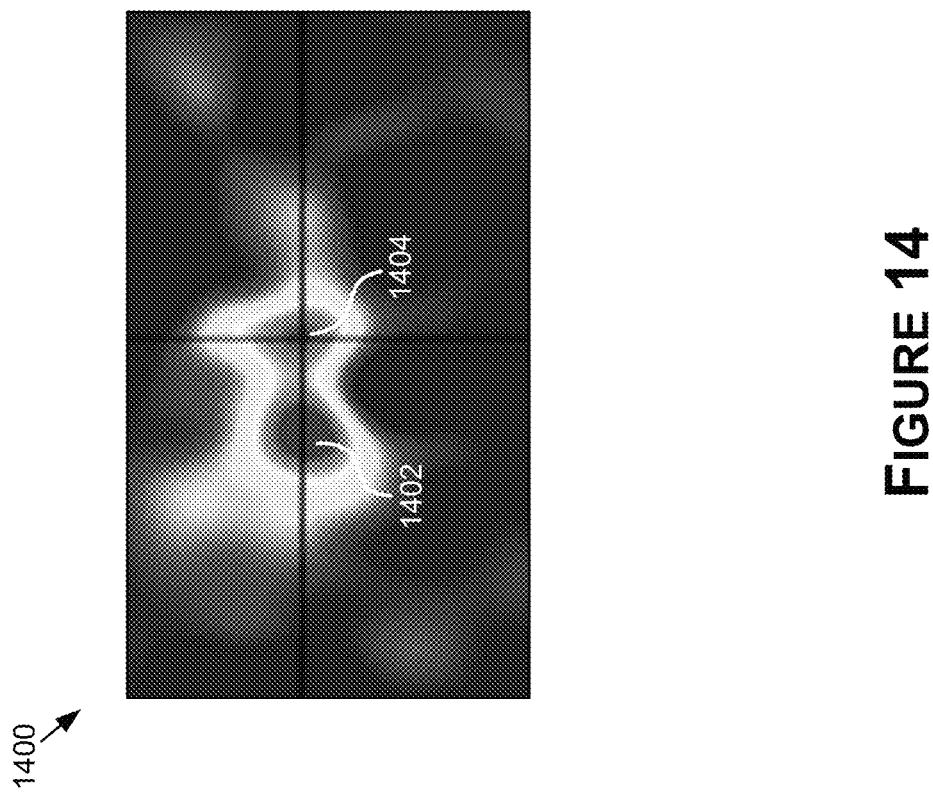
FIG. 14 is a diagram illustrating an example of a correlation response that has multiple modes, in accordance with some embodiments of the present disclosure.

Multiple modes may occur in a correlation response filter for various reasons, such as in cases where a correlation filter is applied to an area occluding a target object, or where there are similarly-looking objects nearby. Referring now to FIG. 14, FIG. 14 is a diagram illustrating an example of a correlation response 1400 that has multiple modes, in accordance with some embodiments of the present disclosure. The correlation response 1400 includes a mode 1402 and a mode 1404 which may, for example, by cause by the occluder 1214 to the target object 1212 of FIG. 12B.

Aspects of the disclosure provide approaches which may be used to better estimate locations of objects when multiple modes are present in a correlation response. In various embodiments, a particle filter may be applied to the correlation response to determine and/or select a peak correlation response value of the correlation response. The particle filter may be based at least on an expected response function, where the expected response function has a single node. In some embodiments, the response function may correspond to a function of the blur filter applied during focused windowing. In any example, the particle filter may be based on a Gaussian response function that has a single node. When multiple modes are present, the modes may be fit to the expected distribution and the fit distribution may define the estimated object location.

Example Autonomous Vehicle

Figure 15A:
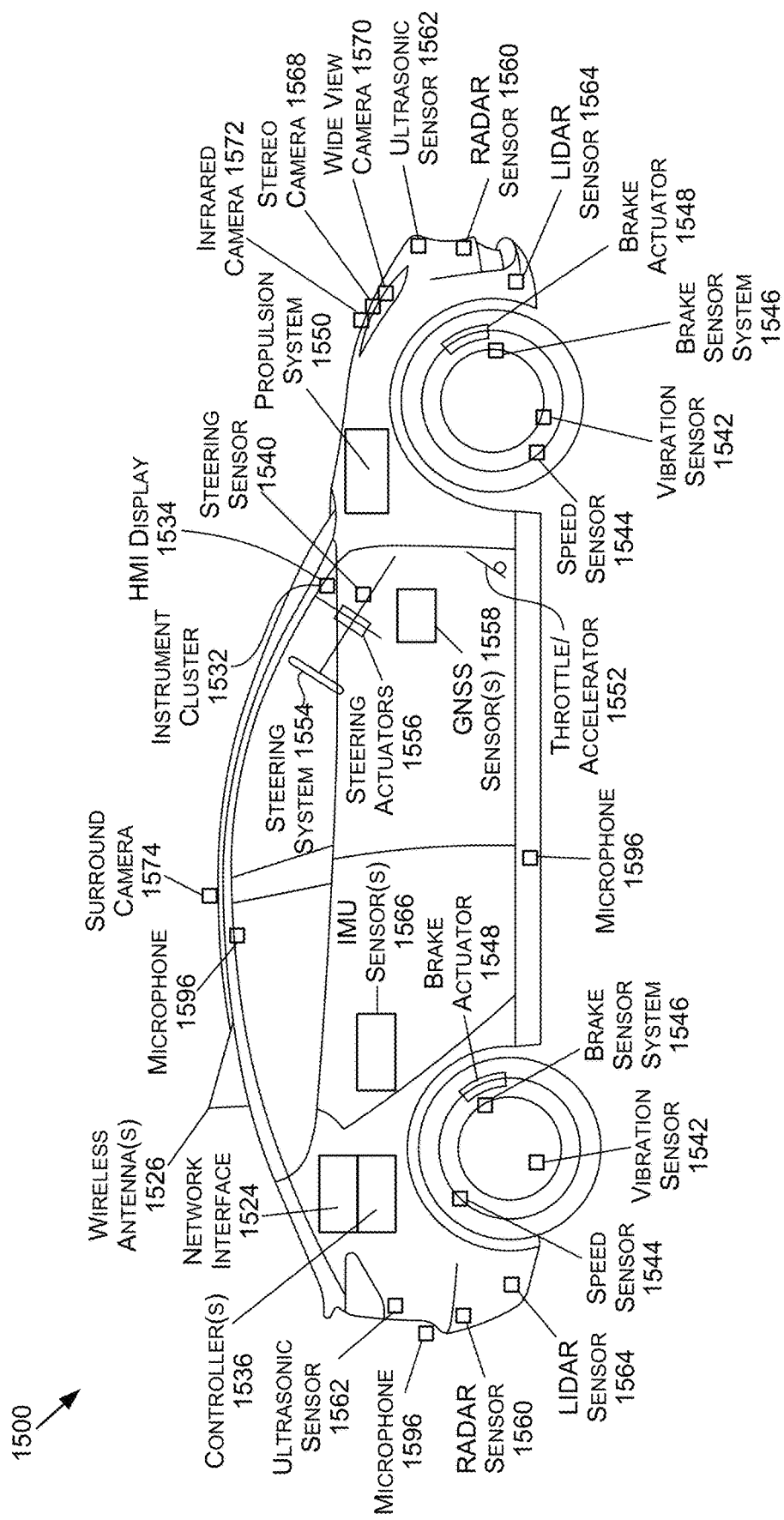
FIG. 15A is an illustration of an example autonomous vehicle, in accordance with some embodiments of the present disclosure.

FIG. 15A is an illustration of an example autonomous vehicle 1500, in accordance with some embodiments of the present disclosure. The autonomous vehicle 1500 (alternatively referred to herein as the "vehicle 1500") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1500 may be capable of functionality in accordance with one or more of Level 3-Level 5 of the autonomous driving levels. For example, the vehicle 1500 may be capable of conditional automation (Level 3), high automation (Level 4), and/or full automation (Level 5), depending on the embodiment.

The vehicle 1500 may include components such as a chassis, a vehicle body, wheels (e.g., 2, 4, 6, 8, 18, etc.), tires, axles, and other components of a vehicle. The vehicle 1500 may include a propulsion system 1550, such as an internal combustion engine, hybrid electric power plant, an all-electric engine, and/or another propulsion system type. The propulsion system 1550 may be connected to a drive train of the vehicle 1500, which may include a transmission, to enable the propulsion of the vehicle 1500. The propulsion system 1550 may be controlled in response to receiving signals from the throttle/accelerator 1552.

A steering system 1554, which may include a steering wheel, may be used to steer the vehicle 1500 (e.g., along a desired path or route) when the propulsion system 1550 is operating (e.g., when the vehicle is in motion). The steering system 1554 may receive signals from a steering actuator 1556. The steering wheel may be optional for full automation (Level 5) functionality.

The brake sensor system 1546 may be used to operate the vehicle brakes in response to receiving signals from the brake actuators 1548 and/or brake sensors.

Controller(s) 1536, which may include one or more system on chips (SoCs) 1504 (FIG. 15C) and/or GPU(s), may provide signals (e.g., representative of commands) to one or more components and/or systems of the vehicle 1500. For example, the controller(s) may send signals to operate the vehicle brakes via one or more brake actuators 1548, to operate the steering system 1554 via one or more steering actuators 1556, to operate the propulsion system 1550 via one or more throttle/accelerators 1552. The controller(s) 1536 may include one or more onboard (e.g., integrated) computing devices (e.g., supercomputers) that process sensor signals, and output operation commands (e.g., signals representing commands) to enable autonomous driving and/or to assist a human driver in driving the vehicle 1500. The controller(s) 1536 may include a first controller 1536 for autonomous driving functions, a second controller 1536 for functional safety functions, a third controller 1536 for artificial intelligence functionality (e.g., computer vision), a fourth controller 1536 for infotainment functionality, a fifth controller 1536 for redundancy in emergency conditions, and/or other controllers. In some examples, a single controller 1536 may handle two or more of the above functionalities, two or more controllers 1536 may handle a single functionality, and/or any combination thereof.

The controller(s) 1536 may provide the signals for controlling one or more components and/or systems of the vehicle 1500 in response to sensor data received from one or more sensors (e.g., sensor inputs). The sensor data may be received from, for example and without limitation, global navigation satellite systems sensor(s) 1558 (e.g., Global Positioning System sensor(s)), RADAR sensor(s) 1560, ultrasonic sensor(s) 1562, LIDAR sensor(s) 1564, inertial measurement unit (IMU) sensor(s) 1566 (e.g., accelerometer(s), gyroscope(s), magnetic compass(es), magnetometer(s), etc.), microphone(s) 1596, stereo camera(s) 1568, wide-view camera(s) 1570 (e.g., fisheye cameras), infrared camera(s) 1572, surround camera(s) 1574 (e.g., 360 degree cameras), long-range and/or mid-range camera(s) 1598, speed sensor(s) 1544 (e.g., for measuring the speed of the vehicle 1500), vibration sensor(s) 1542, steering sensor(s) 1540, brake sensor(s) (e.g., as part of the brake sensor system 1546), and/or other sensor types.

One or more of the controller(s) 1536 may receive inputs (e.g., represented by input data) from an instrument cluster 1532 of the vehicle 1500 and provide outputs (e.g., represented by output data, display data, etc.) via a human-machine interface (HMI) display 1534, an audible annunciator, a loudspeaker, and/or via other components of the vehicle 1500. The outputs may include information such as vehicle velocity, speed, time, map data (e.g., the HD map 1522 of FIG. 15C), location data (e.g., the vehicle's 1500 location, such as on a map), direction, location of other vehicles (e.g., an occupancy grid), information about objects and status of objects as perceived by the controller(s) 1536, etc. For example, the HMI display 1534 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1500 further includes a network interface 1524 which may use one or more wireless antenna(s) 1526 and/or modem(s) to communicate over one or more networks. For example, the network interface 1524 may be capable of communication over LTE, WCDMA, UMTS, GSM, CDMA2000, etc. The wireless antenna(s) 1526 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LP-WANs), such as LoRaWAN, SigFox, etc.

Figure 15B:
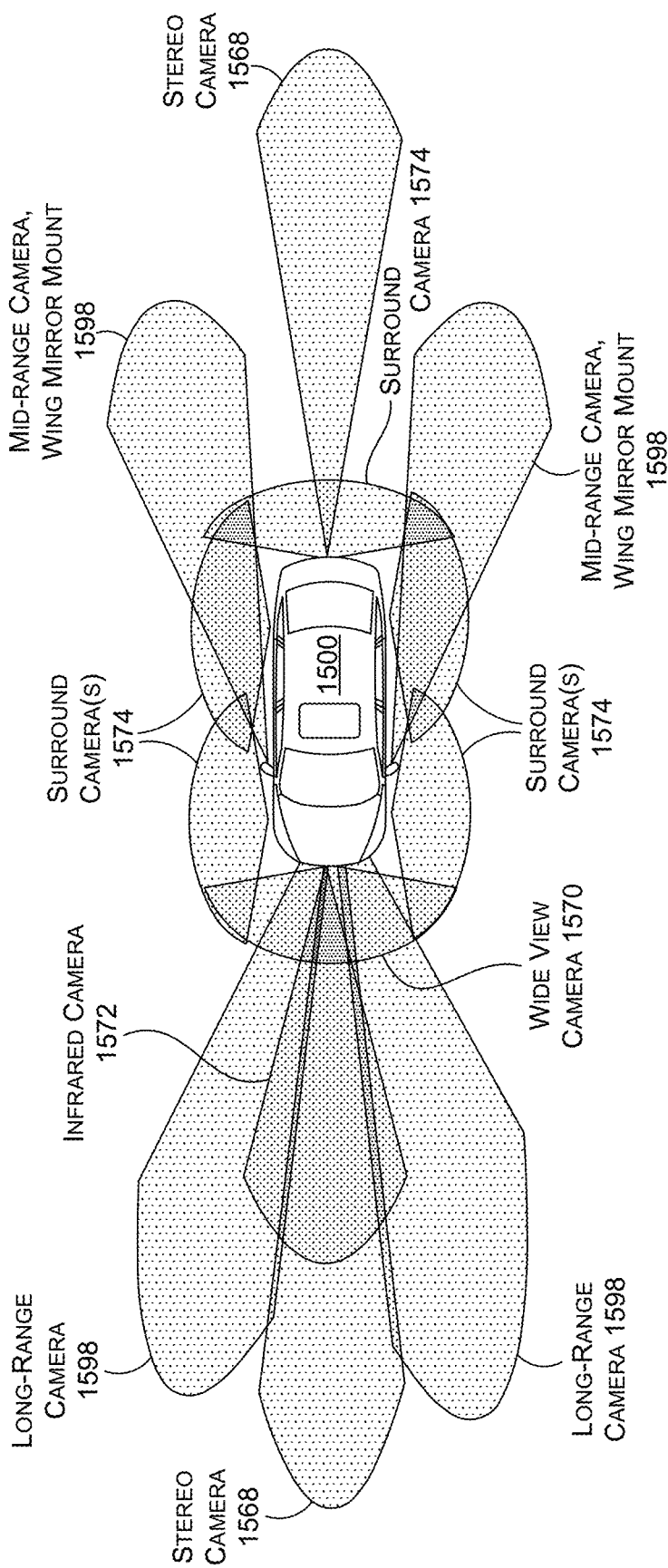
FIG. 15B is an example of camera locations and fields of view for the example autonomous vehicle of FIG. 15A, in accordance with some embodiments of the present disclosure.

FIG. 15B is an example of camera locations and fields of view for the example autonomous vehicle 1500 of FIG. 15A, in accordance with some embodiments of the present disclosure. The cameras and respective fields of view are one example embodiment and are not intended to be limiting. For example, additional and/or alternative cameras may be included and/or the cameras may be located at different locations on the vehicle 1500.

The camera types for the cameras may include, but are not limited to, digital cameras that may be adapted for use with the components and/or systems of the vehicle 1500. The camera(s) may operate at automotive safety integrity level (ASIL) B and/or at another ASIL. The camera types may be capable of any image capture rate, such as 60 frames per second (fps), 1520 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1500 (e.g., front-facing cameras) may be used for surround view, to help identify forward facing paths and obstacles, as well aid in, with the help of one or more controllers 1536 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 1570 that may be used to perceive objects coming into view from the periphery (e.g., pedestrians, crossing traffic or bicycles). Although only one wide-view camera is illustrated in FIG. 15B, there may any number of wide-view cameras 1570 on the vehicle 1500. In addition, long-range camera(s) 1598 (e.g., a long-view stereo camera pair) may be used for depth-based object detection, especially for objects for which a neural network has not yet been trained. The long-range camera(s) 1598 may also be used for object detection and classification, as well as basic object tracking.

One or more stereo cameras 1568 may also be included in a front-facing configuration. The stereo camera(s) 1568 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 1568 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1568 may be used in addition to, or alternatively from, those described herein.

Cameras with a field of view that include portions of the environment to the side of the vehicle 1500 (e.g., side-view cameras) may be used for surround view, providing information used to create and update the occupancy grid, as well as to generate side impact collision warnings. For example, surround camera(s) 1574 (e.g., four surround cameras 1574 as illustrated in FIG. 15B) may be positioned to on the vehicle 1500. The surround camera(s) 1574 may include wide-view camera(s) 1570, fisheye camera(s), 360 degree camera(s), and/or the like. Four example, four fisheye cameras may be positioned on the vehicle's front, rear, and sides. In an alternative arrangement, the vehicle may use three surround camera(s) 1574 (e.g., left, right, and rear), and may leverage one or more other camera(s) (e.g., a forward-facing camera) as a fourth surround view camera.

Cameras with a field of view that include portions of the environment to the rear of the vehicle 1500 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1598, stereo camera(s) 1568), infrared camera(s) 1572, etc.), as described herein.

Figure 15C:
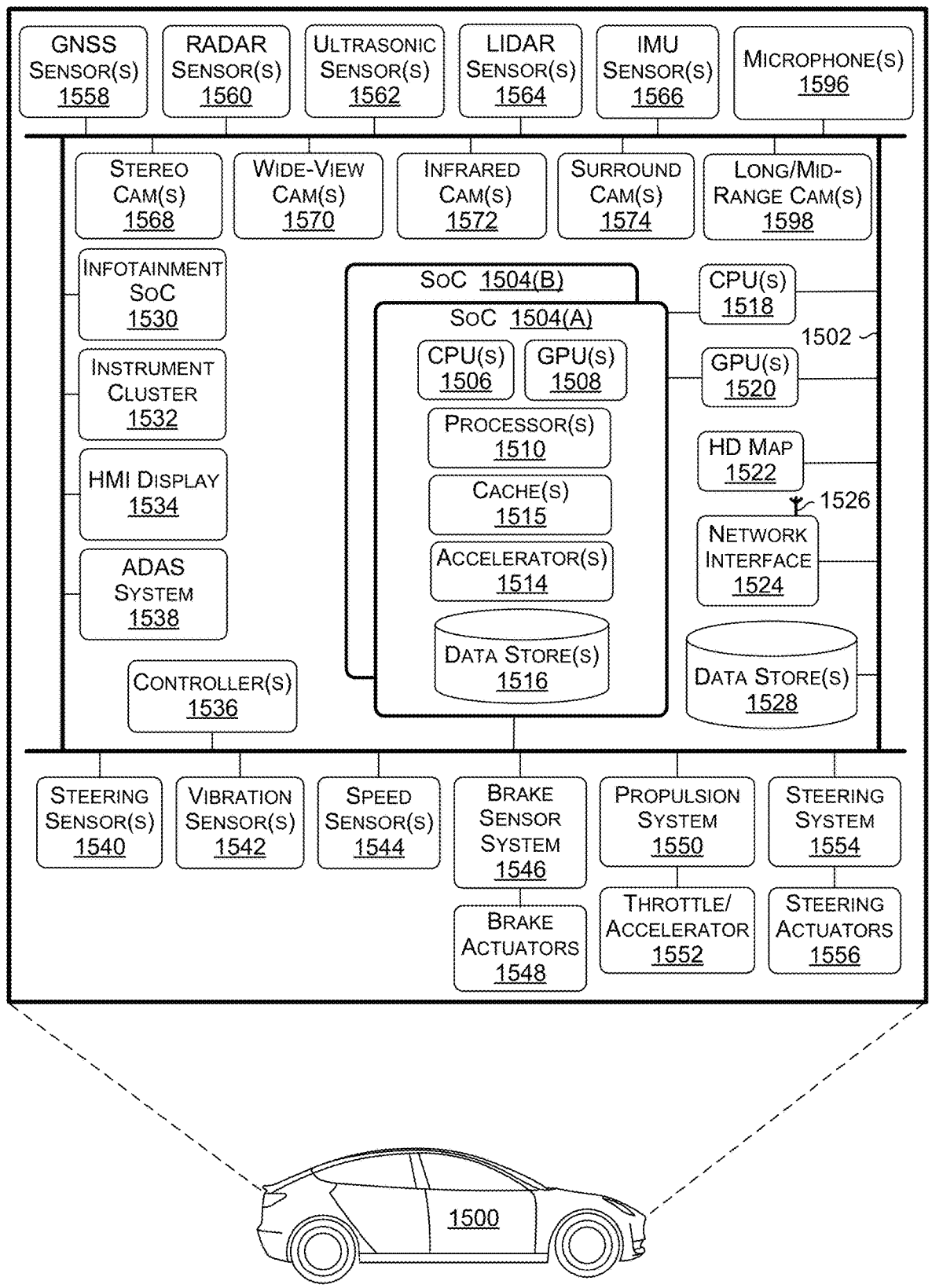
FIG. 15C is a block diagram of an example system architecture for the example autonomous vehicle of FIG. 15A, in accordance with some embodiments of the present disclosure.

FIG. 15C is a block diagram of an example system architecture for the example autonomous vehicle 1500 of FIG. 15A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1500 in FIG. 15C are illustrated as being connected via bus 1502. The bus 1502 may include a Controller Area Network (CAN) data interface (alternatively referred to herein as a "CAN bus"). A CAN may be a network inside the vehicle 1500 used to aid in control of various features and functionality of the vehicle 1500, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1502 is described herein as being a CAN bus, this is not intended to be limiting. For example, in addition to, or alternatively from, the CAN bus, FlexRay and/or Ethernet may be used. Additionally, although a single line is used to represent the bus 1502, this is not intended to be limiting. For example, there may be any number of busses 1502, which may include one or more CAN busses, one or more FlexRay busses, one or more Ethernet busses, and/or one or more other types of busses using a different protocol. In some examples, two or more busses 1502 may be used to perform different functions, and/or may be used for redundancy. For example, a first bus 1502 may be used for collision avoidance functionality and a second bus 1502 may be used for actuation control. In any example, each bus 1502 may communicate with any of the components of the vehicle 1500, and two or more busses 1502 may communicate with the same components. In some examples, each SoC 1504, each controller 1536, and/or each computer within the vehicle may have access to the same input data (e.g., inputs from sensors of the vehicle 1500), and may be connected to a common bus, such the CAN bus.

The vehicle 1500 may include one or more controller(s) 1536, such as those described herein with respect to FIG. 15A. The controller(s) 1536 may be used for a variety of functions. The controller(s) 1536 may be coupled to any of the various other components and systems of the vehicle 1500, and may be used for control of the vehicle 1500, artificial intelligence of the vehicle 1500, infotainment for the vehicle 1500, and/or the like.

The vehicle 1500 may include a system(s) on a chip (SoC) 1504. The SoC 1504 may include CPU(s) 1506, GPU(s) 1508, processor(s) 1510, cache(s) 1512, accelerator(s) 1514, data store(s) 1516, and/or other components and features not illustrated. The SoC(s) 1504 may be used to control the vehicle 1500 in a variety of platforms and systems. For example, the SoC(s) 1504 may be combined in a system (e.g., the system of the vehicle 1500) with an HD map 1522 which may obtain map refreshes and/or updates via a network interface 1524 from one or more servers (e.g., server(s) 1578 of FIG. 15D).

The CPU(s) 1506 may include a CPU cluster or CPU complex (alternatively referred to herein as a "CCPLEX"). The CPU(s) 1506 may include multiple cores and/or L2 caches. For example, in some embodiments, the CPU(s) 1506 may include eight cores in a coherent multi-processor configuration. In some embodiments, the CPU(s) 1506 may include four dual-core clusters where each cluster has a dedicated L2 cache (e.g., a 2 MB L2 cache). The CPU(s) 1506 (e.g., the CCPLEX) may be configured to support simultaneous cluster operation enabling any combination of the clusters of the CPU(s) 1506 to be active at any given time.

The CPU(s) 1506 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1506 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1508 may include an integrated GPU (alternatively referred to herein as an "iGPU"). The GPU(s) 1508 may be programmable and may be efficient for parallel workloads. The GPU(s) 1508, in some examples, may use an enhanced tensor instruction set. The GPU(s) 1508 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1508 may include at least eight streaming microprocessors. The GPU(s) 1508 may use compute application programming interface(s) (API(s)). In addition, the GPU(s) 1508 may use one or more parallel computing platforms and/or programming models (e.g., NVIDIA's CUDA).

The GPU(s) 1508 may be power-optimized for best performance in automotive and embedded use cases. For example, the GPU(s) 1508 may be fabricated on a Fin field-effect transistor (FinFET). However, this is not intended to be limiting and the GPU(s) 1508 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1508 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1508 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1508 to access the CPU(s) 1506 page tables directly. In such examples, when the GPU(s) 1508 memory management unit (MMU) experiences a miss, an address translation request may be transmitted to the CPU(s) 1506. In response, the CPU(s) 1506 may look in its page tables for the virtual-to-physical mapping for the address and transmits the translation back to the GPU(s) 1508. As such, unified memory technology may allow a single unified virtual address space for memory of both the CPU(s) 1506 and the GPU(s) 1508, thereby simplifying the GPU(s) 1508 programming and porting of applications to the GPU(s) 1508.

In addition, the GPU(s) 1508 may include an access counter that may keep track of the frequency of access of the GPU(s) 1508 to memory of other processors. The access counter may help ensure that memory pages are moved to the physical memory of the processor that is accessing the pages most frequently.

The SoC(s) 1504 may include any number of cache(s) 1512, including those described herein. For example, the cache(s) 1512 may include an L3 cache that is available to both the CPU(s) 1506 and the GPU(s) 1508 (e.g., that is connected both the CPU(s) 1506 and the GPU(s) 1508). The cache(s) 1512 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1504 may include an arithmetic logic unit(s) (ALU(s)) which may be leveraged in performing processing with respect to any of the variety of tasks or operations of the vehicle 1500—such as processing DNNs. In addition, the SoC(s) 1504 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 1506 and/or GPU(s) 1508.

The SoC(s) 1504 may include one or more accelerators 1514 (e.g., hardware accelerators, software accelerators, or a combination thereof). For example, the SoC(s) 1504 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1508 and to off-load some of the tasks of the GPU(s) 1508 (e.g., to free up more cycles of the GPU(s) 1508 for performing other tasks). As an example, the accelerator(s) 1514 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1514 (e.g., the hardware acceleration cluster) may include a deep learning accelerator(s) (DLA).

The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1508, and by using an inference accelerator, for example, a designer may target either the DLA(s) or the GPU(s) 1508 for any function. For example, the designer may focus processing of CNNs and floating point operations on the DLA(s) and leave other functions to the GPU(s) 1508 and/or other accelerator(s) 1514.

The accelerator(s) 1514 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1506. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1514 (e.g., the hardware acceleration cluster) may include a computer vision network on-chip and SRAM, for providing a high-bandwidth, low latency SRAM for the accelerator(s) 1514. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1504 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 1514 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1566 output that correlates with the vehicle 1500 orientation, distance, 3D location estimates of the object obtained from the neural network and/or other sensors (e.g., LIDAR sensor(s) 1564 or RADAR sensor(s) 1560), among others.

The SoC(s) 1504 may include data store(s) 1516 (e.g., memory). The data store(s) 1516 may be on-chip memory of the SoC(s) 1504, which may store neural networks to be executed on the GPU and/or the DLA. In some examples, the data store(s) 1516 may be large enough in capacity to store multiple instances of neural networks for redundancy and safety. The data store(s) 1512 may comprise L2 or L3 cache(s) 1512. Reference to the data store(s) 1516 may include reference to the memory associated with the PVA, DLA, and/or other accelerator(s) 1514, as described herein.

The SoC(s) 1504 may include one or more processor(s) 1510 (e.g., embedded processors). The processor(s) 1510 may include a boot and power management processor that may be a dedicated processor and subsystem to handle boot power and management functions and related security enforcement. The boot and power management processor may be a part of the SoC(s) 1504 boot sequence and may provide runtime power management services. The boot power and management processor may provide clock and voltage programming, assistance in system low power state transitions, management of SoC(s) 1504 thermals and temperature sensors, and/or management of the SoC(s) 1504 power states. Each temperature sensor may be implemented as a ring-oscillator whose output frequency is proportional to temperature, and the SoC(s) 1504 may use the ring-oscillators to detect temperatures of the CPU(s) 1506, GPU(s) 1508, and/or accelerator(s) 1514. If temperatures are determined to exceed a threshold, the boot and power management processor may enter a temperature fault routine and put the SoC(s) 1504 into a lower power state and/or put the vehicle 1500 into a chauffeur to safe stop mode (e.g., bring the vehicle 1500 to a safe stop).

The processor(s) 1510 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1510 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1510 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1510 may further include a real-time camera engine that may include a dedicated processor subsystem for handling real-time camera management.

The processor(s) 1510 may further include a high-dynamic range signal processor that may include an image signal processor that is a hardware engine that is part of the camera processing pipeline.

The processor(s) 1510 may include a video image compositor that may be a processing block (e.g., implemented on a microprocessor) that implements video post-processing functions needed by a video playback application to produce the final image for the player window. The video image compositor may perform lens distortion correction on wide-view camera(s) 1570, surround camera(s) 1574, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1508 is not required to continuously render new surfaces. Even when the GPU(s) 1508 is powered on and active doing 3D rendering, the video image compositor may be used to offload the GPU(s) 1508 to improve performance and responsiveness.

The SoC(s) 1504 may further include a mobile industry processor interface (MIPI) camera serial interface for receiving video and input from cameras, a high-speed interface, and/or a video input block that may be used for camera and related pixel input functions. The SoC(s) 1504 may further include an input/output controller(s) that may be controlled by software and may be used for receiving I/O signals that are uncommitted to a specific role.

The SoC(s) 1504 may further include a broad range of peripheral interfaces to enable communication with peripherals, audio codecs, power management, and/or other devices. The SoC(s) 1504 may be used to process data from cameras (e.g., connected over Gigabit Multimedia Serial Link and Ethernet), sensors (e.g., LIDAR sensor(s) 1564, RADAR sensor(s) 1560, etc. that may be connected over Ethernet), data from bus 1502 (e.g., speed of vehicle 1500, steering wheel position, etc.), data from GNSS sensor(s) 1558 (e.g., connected over Ethernet or CAN bus). The SoC(s) 1504 may further include dedicated high-performance mass storage controllers that may include their own DMA engines, and that may be used to free the CPU(s) 1506 from routine data management tasks.

The SoC(s) 1504 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1504 may be faster, more reliable, and even more energy-efficient and space-efficient than conventional systems. For example, the accelerator(s) 1514, when combined with the CPU(s) 1506, the GPU(s) 1508, and the data store(s) 1516, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1520) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1508.

In some examples, a CNN for facial recognition and vehicle owner identification may use data from camera sensors to identify the presence of an authorized driver and/or owner of the vehicle 1500. The always on sensor processing engine may be used to unlock the vehicle when the owner approaches the driver door and turn on the lights, and, in security mode, to disable the vehicle when the owner leaves the vehicle. In this way, the SoC(s) 1504 provide for security against theft and/or carjacking.

In another example, a CNN for emergency vehicle detection and identification may use data from microphones 1596 to detect and identify emergency vehicle sirens. In contrast to conventional systems, that use general classifiers to detect sirens and manually extract features, the SoC(s) 1504 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1558. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1562, until the emergency vehicle(s) passes.

The vehicle may include a CPU(s) 1518 (e.g., discrete CPU(s), or dCPU(s)), that may be coupled to the SoC(s) 1504 via a high-speed interconnect (e.g., PCIe). The CPU(s) 1518 may include an X86 processor, for example. The CPU(s) 1518 may be used to perform any of a variety of functions, including arbitrating potentially inconsistent results between ADAS sensors and the SoC(s) 1504, and/or monitoring the status and health of the controller(s) 1536 and/or infotainment SoC 1530, for example.

The vehicle 1500 may include a GPU(s) 1520 (e.g., discrete GPU(s), or dGPU(s)), that may be coupled to the SoC(s) 1504 via a high-speed interconnect (e.g., NVIDIA's NVLINK). The GPU(s) 1520 may provide additional artificial intelligence functionality, such as by executing redundant and/or different neural networks, and may be used to train and/or update neural networks based on input (e.g., sensor data) from sensors of the vehicle 1500.

The vehicle 1500 may further include the network interface 1524 which may include one or more wireless antennas 1526 (e.g., one or more wireless antennas for different communication protocols, such as a cellular antenna, a Bluetooth antenna, etc.). The network interface 1524 may be used to enable wireless connectivity over the Internet with the cloud (e.g., with the server(s) 1578 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1500 information about vehicles in proximity to the vehicle 1500 (e.g., vehicles in front of, on the side of, and/or behind the vehicle 1500). This functionality may be part of a cooperative adaptive cruise control functionality of the vehicle 1500.

The network interface 1524 may include a SoC that provides modulation and demodulation functionality and enables the controller(s) 1536 to communicate over wireless networks. The network interface 1524 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1500 may further include data store(s) 1528 which may include off-chip (e.g., off the SoC(s) 1504) storage. The data store(s) 1528 may include one or more storage elements including RAM, SRAM, DRAM, VRAM, Flash, hard disks, and/or other components and/or devices that may store at least one bit of data.

The vehicle 1500 may further include GNSS sensor(s) 1558. The GNSS sensor(s) 1558 (e.g., GPS, assisted GPS sensors, differential GPS (DGPS) sensors, etc.), to assist in mapping, perception, occupancy grid generation, and/or path planning functions. Any number of GNSS sensor(s) 1558 may be used, including, for example and without limitation, a GPS using a USB connector with an Ethernet to Serial (RS-232) bridge.

The vehicle 1500 may further include RADAR sensor(s) 1560. The RADAR sensor(s) 1560 may be used by the vehicle 1500 for long-range vehicle detection, even in darkness and/or severe weather conditions. RADAR functional safety levels may be ASIL B. The RADAR sensor(s) 1560 may use the CAN and/or the bus 1502 (e.g., to transmit data generated by the RADAR sensor(s) 1560) for control and to access object tracking data, with access to Ethernet to access raw data in some examples. A wide variety of RADAR sensor types may be used. For example, and without limitation, the RADAR sensor(s) 1560 may be suitable for front, rear, and side RADAR use. In some example, Pulse Doppler RADAR sensor(s) are used.

The RADAR sensor(s) 1560 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1560 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1500 surroundings at higher speeds with minimal interference from traffic in adjacent lanes. The other two antennae may expand the field of view, making it possible to quickly detect vehicles entering or leaving the vehicle's 1500 lane.

Mid-range RADAR systems may include, as an example, a range of up to 1560 m (front) or 80 m (rear), and a field of view of up to 42 degrees (front) or 1550 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1500 may further include ultrasonic sensor(s) 1562. The ultrasonic sensor(s) 1562, which may be positioned at the front, back, and/or the sides of the vehicle 1500, may be used for park assist and/or to create and update an occupancy grid. A wide variety of ultrasonic sensor(s) 1562 may be used, and different ultrasonic sensor(s) 1562 may be used for different ranges of detection (e.g., 2.5 m, 4 m). The ultrasonic sensor(s) 1562 may operate at functional safety levels of ASIL B.

The vehicle 1500 may include LIDAR sensor(s) 1564. The LIDAR sensor(s) 1564 may be used for object and pedestrian detection, emergency braking, collision avoidance, and/or other functions. The LIDAR sensor(s) 1564 may be functional safety level ASIL B. In some examples, the vehicle 1500 may include multiple LIDAR sensors 1564 (e.g., two, four, six, etc.) that may use Ethernet (e.g., to provide data to a Gigabit Ethernet switch).

In some examples, the LIDAR sensor(s) 1564 may be capable of providing a list of objects and their distances for a 360-degree field of view. Commercially available LIDAR sensor(s) 1564 may have an advertised range of approximately 1500 m, with an accuracy of 2 cm-3 cm, and with support for a 1500 Mbps Ethernet connection, for example.

In some examples, one or more non-protruding LIDAR sensors 1564 may be used. In such examples, the LIDAR sensor(s) 1564 may be implemented as a small device that may be embedded into the front, rear, sides, and/or corners of the vehicle 1500. The LIDAR sensor(s) 1564, in such examples, may provide up to a 1520-degree horizontal and 35-degree vertical field-of-view, with a 200 m range even for low-reflectivity objects. Front-mounted LIDAR sensor(s) 1564 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 1500. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1564 may be less susceptible to motion blur, vibration, and/or shock.

The vehicle may further include IMU sensor(s) 1566. The IMU sensor(s) 1566 may be located at a center of the rear axle of the vehicle 1500, in some examples. The IMU sensor(s) 1566 may include, for example and without limitation, an accelerometer(s), a magnetometer(s), a gyroscope(s), a magnetic compass(es), and/or other sensor types. In some examples, such as in six-axis applications, the IMU sensor(s) 1566 may include accelerometers and gyroscopes, while in nine-axis applications, the IMU sensor(s) 1566 may include accelerometers, gyroscopes, and magnetometers.

In some embodiments, the IMU sensor(s) 1566 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1566 may enable the vehicle 1500 to estimate heading without requiring input from a magnetic sensor by directly observing and correlating the changes in velocity from GPS to the IMU sensor(s) 1566. In some examples, the IMU sensor(s) 1566 and the GNSS sensor(s) 1558 may be combined in a single integrated unit.

The vehicle may include microphone(s) 1596 placed in and/or around the vehicle 1500. The microphone(s) 1596 may be used for emergency vehicle detection and identification, among other things.

The vehicle may further include any number of camera types, including stereo camera(s) 1568, wide-view camera(s) 1570, infrared camera(s) 1572, surround camera(s) 1574, long-range and/or mid-range camera(s) 1598, and/or other camera types. The cameras may be used to capture image data around an entire periphery of the vehicle 1500. The types of cameras used depends on the embodiments and requirements for the vehicle 1500, and any combination of camera types may be used to provide the necessary coverage around the vehicle 1500. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 15A and FIG. 15B.

The vehicle 1500 may further include vibration sensor(s) 1542. The vibration sensor(s) 1542 may measure vibrations of components of the vehicle, such as the axle(s). For example, changes in vibrations may indicate a change in road surfaces. In another example, when two or more vibration sensors 1542 are used, the differences between the vibrations may be used to determine friction or slippage of the road surface (e.g., when the difference in vibration is between a power-driven axle and a freely rotating axle).

The vehicle 1500 may include an ADAS system 1538. The ADAS system 1538 may include a SoC, in some examples. The ADAS system 1538 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1560, LIDAR sensor(s) 1564, and/or a camera(s). The ACC systems may include longitudinal ACC and/or lateral ACC. Longitudinal ACC monitors and controls the distance to the vehicle immediately ahead of the vehicle 1500 and automatically adjust the vehicle speed to maintain a safe distance from vehicles ahead. Lateral ACC performs distance keeping, and advises the vehicle 1500 to change lanes when necessary. Lateral ACC is related to other ADAS applications such as LCA and CWS.

CACC uses information from other vehicles that may be received via the network interface 1524 and/or the wireless antenna(s) 1526 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 1500), while the I2V communication concept provides information about traffic further ahead. CACC systems may include either or both I2V and V2V information sources. Given the information of the vehicles ahead of the vehicle 1500, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1560, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1560, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1500 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1500 if the vehicle 1500 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1560, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1500 is backing up. Some RCTW systems include AEB to ensure that the vehicle brakes are applied to avoid a crash. RCTW systems may use one or more rear-facing RADAR sensor(s) 1560, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1500, the vehicle 1500 itself must, in the case of conflicting results, decide whether to heed the result from a primary computer or a secondary computer (e.g., a first controller 1536 or a second controller 1536). For example, in some embodiments, the ADAS system 1538 may be a backup and/or secondary computer for providing perception information to a backup computer rationality module. The backup computer rationality monitor may run a redundant diverse software on hardware components to detect faults in perception and dynamic driving tasks. Outputs from the ADAS system 1538 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1504.

In other examples, ADAS system 1538 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1538 may be fed into the primary computer's perception block and/or the primary computer's dynamic driving task block. For example, if the ADAS system 1538 indicates a forward crash warning due to an object immediately ahead, the perception block may use this information when identifying objects. In other examples, the secondary computer may have its own neural network which is trained and thus reduces the risk of false positives, as described herein.

The vehicle 1500 may further include the infotainment SoC 1530 (e.g., an in-vehicle infotainment system (IVI)). Although illustrated and described as a SoC, the infotainment system may not be a SoC, and may include two or more discrete components. The infotainment SoC 1530 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 1500. For example, the infotainment SoC 1530 may radios, disk players, navigation systems, video players, USB and Bluetooth connectivity, carputers, in-car entertainment, Wi-Fi, steering wheel audio controls, hands free voice control, a heads-up display (HUD), an HMI display 1534, a telematics device, a control panel (e.g., for controlling and/or interacting with various components, features, and/or systems), and/or other components. The infotainment SoC 1530 may further be used to provide information (e.g., visual and/or audible) to a user(s) of the vehicle, such as information from the ADAS system 1538, autonomous driving information such as planned vehicle maneuvers, trajectories, surrounding environment information (e.g., intersection information, vehicle information, road information, etc.), and/or other information.

The infotainment SoC 1530 may include GPU functionality. The infotainment SoC 1530 may communicate over the bus 1502 (e.g., CAN bus, Ethernet, etc.) with other devices, systems, and/or components of the vehicle 1500. In some examples, the infotainment SoC 1530 may be coupled to a supervisory MCU such that the GPU of the infotainment system may perform some self-driving functions in the event that the primary controller(s) 1536 (e.g., the primary and/or backup computers of the vehicle 1500) fail. In such an example, the infotainment SoC 1530 may put the vehicle 1500 into a chauffeur to safe stop mode, as described herein.

The vehicle 1500 may further include an instrument cluster 1532 (e.g., a digital dash, an electronic instrument cluster, a digital instrument panel, etc.). The instrument cluster 1532 may include a controller and/or supercomputer (e.g., a discrete controller or supercomputer). The instrument cluster 1532 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1530 and the instrument cluster 1532. In other words, the instrument cluster 1532 may be included as part of the infotainment SoC 1530, or vice versa.

Figure 15D:
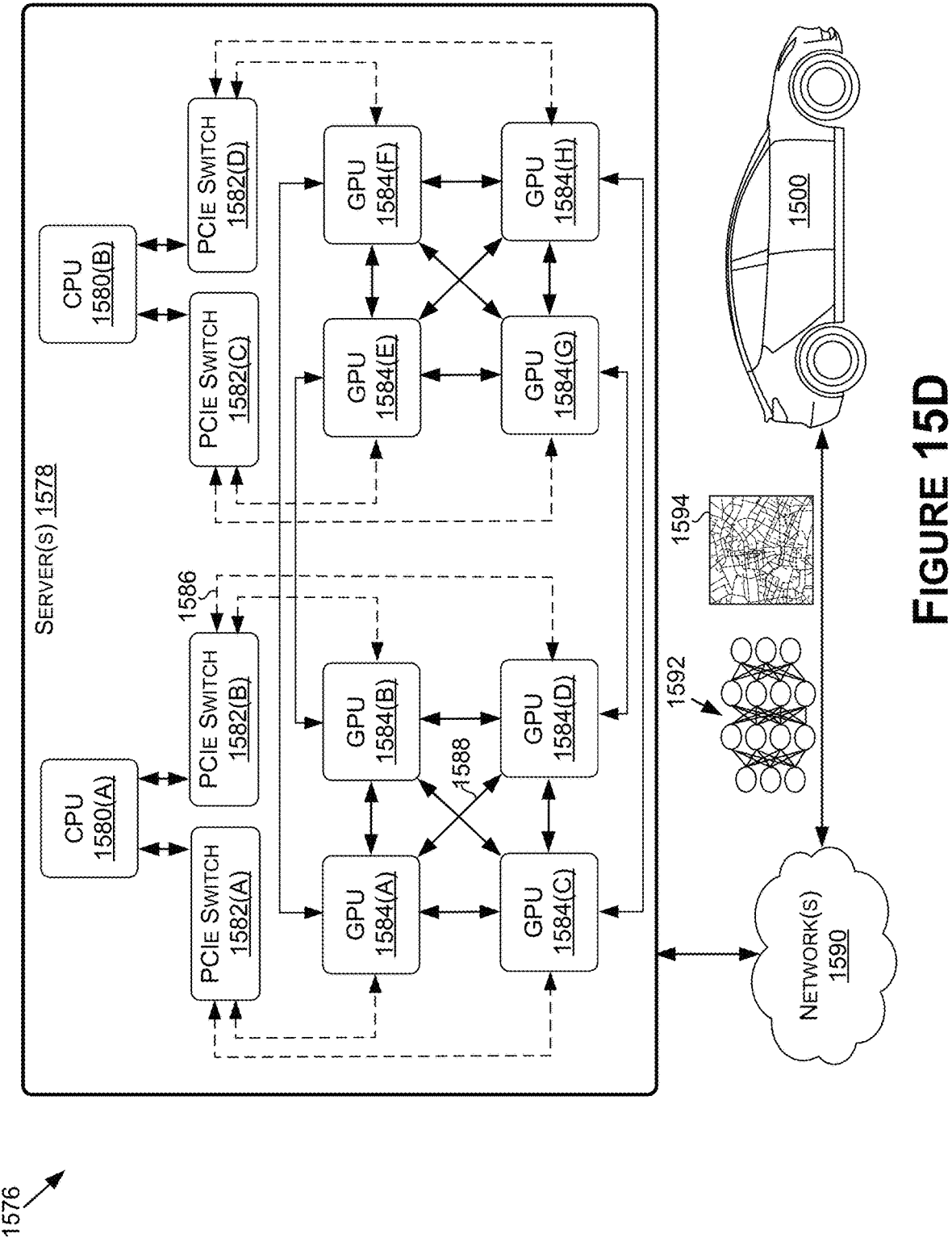
FIG. 15D is a system diagram for communication between cloud-based server(s) and the example autonomous vehicle of FIG. 15A, in accordance with some embodiments of the present disclosure.

FIG. 15D is a system diagram for communication between cloud-based server(s) and the example autonomous vehicle 1500 of FIG. 15A, in accordance with some embodiments of the present disclosure. The system 1576 may include server(s) 1578, network(s) 1590, and vehicles, including the vehicle 1500. The server(s) 1578 may include a plurality of GPUs 1584(A)-1584(H) (collectively referred to herein as GPUs 1584), PCIe switches 1582(A)-1582(H) (collectively referred to herein as PCIe switches 1582), and/or CPUs 1580(A)-1580(B) (collectively referred to herein as CPUs 1580). The GPUs 1584, the CPUs 1580, and the PCIe switches may be interconnected with high-speed interconnects such as, for example and without limitation, NVLink interfaces 1588 developed by NVIDIA and/or PCIe connections 1586. In some examples, the GPUs 1584 are connected via NVLink and/or NVSwitch SoC and the GPUs 1584 and the PCIe switches 1582 are connected via PCIe interconnects. Although eight GPUs 1584, two CPUs 1580, and two PCIe switches are illustrated, this is not intended to be limiting. Depending on the embodiment, each of the server(s) 1578 may include any number of GPUs 1584, CPUs 1580, and/or PCIe switches. For example, the server(s) 1578 may each include eight, sixteen, thirty-two, and/or more GPUs 1584.

The server(s) 1578 may receive, over the network(s) 1590 and from the vehicles, image data representative of images showing unexpected or changed road conditions, such as recently commenced road-work. The server(s) 1578 may transmit, over the network(s) 1590 and to the vehicles, neural networks 1592, updated neural networks 1592, and/or map information 1594, including information regarding traffic and road conditions. The updates to the map information 1594 may include updates for the HD map 1522, such as information regarding construction sites, potholes, detours, flooding, and/or other obstructions. In some examples, the neural networks 1592, the updated neural networks 1592, and/or the map information 1594 may have resulted from new training and/or experiences represented in data received from any number of vehicles in the environment, and/or based on training performed at a datacenter (e.g., using the server(s) 1578 and/or other servers).

The server(s) 1578 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 1590, and/or the machine learning models may be used by the server(s) 1578 to remotely monitor the vehicles.

In some examples, the server(s) 1578 may receive data from the vehicles and apply the data to up-to-date real-time neural networks for real-time intelligent inferencing. The server(s) 1578 may include deep-learning supercomputers and/or dedicated AI computers powered by GPU(s) 1584, such as a DGX and DGX Station machines developed by NVIDIA. However, in some examples, the server(s) 1578 may include deep learning infrastructure that use only CPU-powered datacenters.

The deep-learning infrastructure of the server(s) 1578 may be capable of fast, real-time inferencing, and may use that capability to evaluate and verify the health of the processors, software, and/or associated hardware in the vehicle 1500. For example, the deep-learning infrastructure may receive periodic updates from the vehicle 1500, such as a sequence of images and/or objects that the vehicle 1500 has located in that sequence of images (e.g., via computer vision and/or other machine learning object classification techniques). The deep-learning infrastructure may run its own neural network to identify the objects and compare them with the objects identified by the vehicle 1500 and, if the results do not match and the infrastructure concludes that the AI in the vehicle 1500 is malfunctioning, the server(s) 1578 may transmit a signal to the vehicle 1500 instructing a fail-safe computer of the vehicle 1500 to assume control, notify the passengers, and complete a safe parking maneuver.

For inferencing, the server(s) 1578 may include the GPU(s) 1584 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 16:
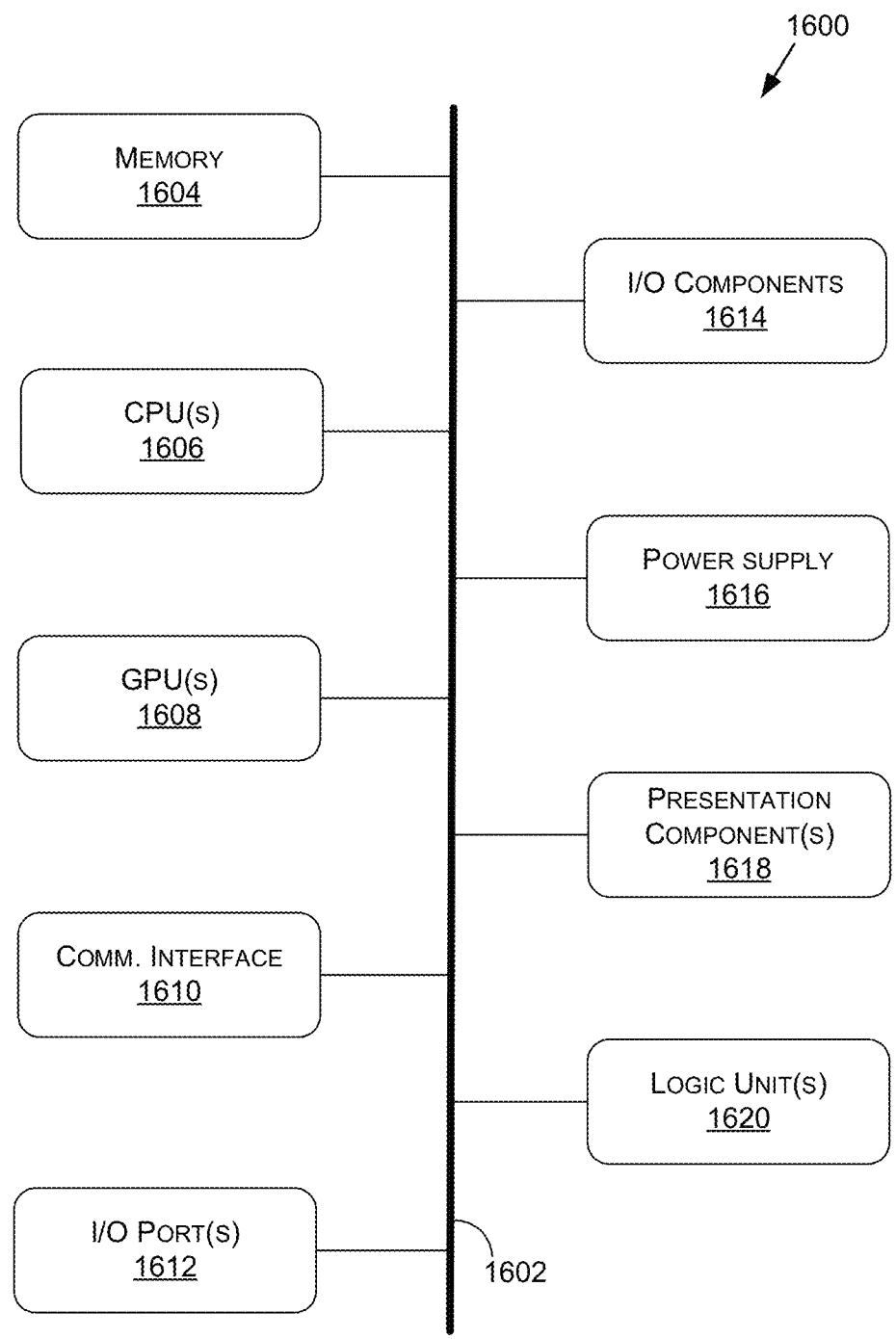
FIG. 16 is a block diagram of an example computing device suitable for use in implementing some embodiments of the present disclosure.

FIG. 16 is a block diagram of an example computing device(s) 1600 suitable for use in implementing some embodiments of the present disclosure. Computing device 1600 may include an interconnect system 1602 that directly or indirectly couples the following devices: memory 1604, one or more central processing units (CPUs) 1606, one or more graphics processing units (GPUs) 1608, a communication interface 1610, input/output (I/O) ports 1612, input/output components 1614, a power supply 1616, one or more presentation components 1618 (e.g., display(s)), and one or more logic units 1620.

Although the various blocks of FIG. 16 are shown as connected via the interconnect system 1602 with lines, this is not intended to be limiting and is for clarity only. For example, in some embodiments, a presentation component 1618, such as a display device, may be considered an I/O component 1614 (e.g., if the display is a touch screen). As another example, the CPUs 1606 and/or GPUs 1608 may include memory (e.g., the memory 1604 may be representative of a storage device in addition to the memory of the GPUs 1608, the CPUs 1606, and/or other components). In other words, the computing device of FIG. 16 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 16.

The interconnect system 1602 may represent one or more links or busses, such as an address bus, a data bus, a control bus, or a combination thereof. The interconnect system 1602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1606 may be directly connected to the memory 1604. Further, the CPU 1606 may be directly connected to the GPU 1608. Where there is direct, or point-to-point connection between components, the interconnect system 1602 may include a PCIe link to carry out the connection. In these examples, a PCI bus need not be included in the computing device 1600.

The memory 1604 may include any of a variety of computer-readable media. The computer-readable media may be any available media that may be accessed by the computing device 1600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1606 may be configured to execute at least some of the computer-readable instructions to control one or more components of the computing device 1600 to perform one or more of the methods and/or processes described herein. The CPU(s) 1606 may each include one or more cores (e.g., one, two, four, eight, twenty-eight, seventy-two, etc.) that are capable of handling a multitude of software threads simultaneously. The CPU(s) 1606 may include any type of processor, and may include different types of processors depending on the type of computing device 1600 implemented (e.g., processors with fewer cores for mobile devices and processors with more cores for servers). For example, depending on the type of computing device 1600, the processor may be an Advanced RISC Machines (ARM) processor implemented using Reduced Instruction Set Computing (RISC) or an x86 processor implemented using Complex Instruction Set Computing (CISC). The computing device 1600 may include one or more CPUs 1606 in addition to one or more microprocessors or supplementary co-processors, such as math co-processors.

In addition to or alternatively from the CPU(s) 1606, the GPU(s) 1608 may be configured to execute at least some of the computer-readable instructions to control one or more components of the computing device 1600 to perform one or more of the methods and/or processes described herein. One or more of the GPU(s) 1608 may be an integrated GPU (e.g., with one or more of the CPU(s) 1606 and/or one or more of the GPU(s) 1608 may be a discrete GPU. In embodiments, one or more of the GPU(s) 1608 may be a coprocessor of one or more of the CPU(s) 1606. The GPU(s) 1608 may be used by the computing device 1600 to render graphics (e.g., 3D graphics) or perform general purpose computations. For example, the GPU(s) 1608 may be used for General-Purpose computing on GPUs (GPGPU). The GPU(s) 1608 may include hundreds or thousands of cores that are capable of handling hundreds or thousands of software threads simultaneously. The GPU(s) 1608 may generate pixel data for output images in response to rendering commands (e.g., rendering commands from the CPU(s) 1606 received via a host interface). The GPU(s) 1608 may include graphics memory, such as display memory, for storing pixel data or any other suitable data, such as GPGPU data. The display memory may be included as part of the memory 1604. The GPU(s) 1608 may include two or more GPUs operating in parallel (e.g., via a link). The link may directly connect the GPUs (e.g., using NVLINK) or may connect the GPUs through a switch (e.g., using NVSwitch). When combined together, each GPU 1608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1606 and/or the GPU(s) 1608, the logic unit(s) 1620 may be configured to execute at least some of the computer-readable instructions to control one or more components of the computing device 1600 to perform one or more of the methods and/or processes described herein. In embodiments, the CPU(s) 1606, the GPU(s) 1608, and/or the logic unit(s) 1620 may discretely or jointly perform any combination of the methods, processes and/or portions thereof. One or more of the logic units 1620 may be part of and/or integrated in one or more of the CPU(s) 1606 and/or the GPU(s) 1608 and/or one or more of the logic units 1620 may be discrete components or otherwise external to the CPU(s) 1606 and/or the GPU(s) 1608. In embodiments, one or more of the logic units 1620 may be a coprocessor of one or more of the CPU(s) 1606 and/or one or more of the GPU(s) 1608.

Examples of the logic unit(s) 1620 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1610 may include one or more receivers, transmitters, and/or transceivers that enable the computing device 1600 to communicate with other computing devices via an electronic communication network, included wired and/or wireless communications. The communication interface 1610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 1612 may enable the computing device 1600 to be logically coupled to other devices including the I/O components 1614, the presentation component(s) 1618, and/or other components, some of which may be built in to (e.g., integrated in) the computing device 1600. Illustrative I/O components 1614 include a microphone, mouse, keyboard, joystick, game pad, game controller, satellite dish, scanner, printer, wireless device, etc. The I/O components 1614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1600. The computing device 1600 may be include depth cameras, such as stereoscopic camera systems, infrared camera systems, RGB camera systems, touchscreen technology, and combinations of these, for gesture detection and recognition. Additionally, the computing device 1600 may include accelerometers or gyroscopes (e.g., as part of an inertia measurement unit (IMU)) that enable detection of motion. In some examples, the output of the accelerometers or gyroscopes may be used by the computing device 1600 to render immersive augmented reality or virtual reality.

The power supply 1616 may include a hard-wired power supply, a battery power supply, or a combination thereof. The power supply 1616 may provide power to the computing device 1600 to enable the components of the computing device 1600 to operate.

The presentation component(s) 1618 may include a display (e.g., a monitor, a touch screen, a television screen, a heads-up-display (HUD), other display types, or a combination thereof), speakers, and/or other presentation components. The presentation component(s) 1618 may receive data from other components (e.g., the GPU(s) 1608, the CPU(s) 1606, etc.), and output the data (e.g., as an image, video, sound, etc.).

Examples of Suitable Network Environments

Network environments suitable for use in implementing embodiments of the disclosure may include one or more client devices and/or servers. The client devices and/or servers (e.g., each device) may be implemented on one or more instances of the computing device(s) 1600 of FIG. 16.

Components of a network environment may communicate with each other via a network, which may be wired, wireless, or both. The network may include multiple networks, or a network of networks. By way of example, the network may include one or more Wide Area Networks (WANs), one or more Local Area Networks (LANs), one or more public networks such as the Internet, and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications, such as those provided by Amazon Web Services, Google Cloud and Microsoft Azure. One or more of the client devices may use the web-based service software or applications. The framework layer may be, but is not limited to, a type of free and open-source software web application framework such as Apache Spark™ that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers. If a connection to a user (e.g., a client device) is relatively close to an edge server(s), a core server(s) may designate at least a portion of the functionality to the edge server(s). A cloud-based network environment may be private (e.g., limited to a single organization) or may be public (e.g., available to many organizations).

The client device(s) may include at least some of the components, features, and functionality of the example computing device(s) 1600 described herein with respect to FIG. 16. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A computer-implemented method comprising:
   identifying, from one or more first images of one or more videos, one or more image areas that correspond to one or more detected locations of one or more objects in the one or more videos;
   based at least on the identifying, applying focused windowing to the one or more image areas, the focused windowing including blurring one or more regions corresponding to one or more backgrounds of the one or more objects in the one or more image areas based at least on a distance of the one or more regions from a target object in the one or more image areas;
   updating, using the one or more image areas and based at least on the blurring, one or more correlation filters; and
   generating, from the one or more correlation filters and based at least on the updating, one or more estimated object locations that correspond to one or more search regions of one or more second images of the one or more videos based at least on applying the one or more correlation filters to the one or more search regions.

2. The method of claim 1, wherein the one or more image areas are based at least on first search regions of the one or more videos, the first search regions identified by tracking objects using versions of the one or more correlation filters, and wherein the updating comprises updating one or more of the versions of the one or more correlation filters.

3. The method of claim 1, wherein the updating comprises initializing the one or more of the correlation filters based at least on determining one or more of a newly detected object or a newly tracked object.

4. The method of claim 1, wherein the blurring is performed using a blur filter and one or more properties of an impulse response of the blur filter is adjusted based at least on a size of the target object.

5. The method of claim 1, comprising generating occlusion maps from the one or more image areas, wherein each correlation filter of the correlation filters is generated from an image area of the one or more image areas using an occlusion map of the occlusion maps.

6. The method of claim 1, further comprising:
   extracting, from the one or more image areas, one or more feature channels of the one or more image areas, wherein updating additionally uses the one or more feature channels.

7. The method of claim 1, further comprising:
   determining a first estimated object location using a correlation response of a version of a correlation filter of the one or more correlation filters; and
   determining a confidence score for a detected location of the one or more detected locations of one or more objects based at least on a correlation response value of the correlation response that corresponds to the detected location, wherein the determining the one or more correlation filters comprises updating the version of the correlation filter using a learning rate that is based at least on the confidence score.

8. A system comprising:
one or more processing units to perform operations including:
   determining one or more image areas that correspond to one or more locations of one or more objects in one or more first images;
   based at least on the determining, applying one or more focused windows to the one or more image areas, the applying including blurring one or more regions corresponding to one or more backgrounds of the one or more objects in the one or more image areas based at least on a distance of the one or more regions from a target object in the one or more image areas to generate one or more focused image areas;
   learning one or more values of one or more correlation filters using the one or more focused image areas; and
   generating one or more object locations based at least on applying the one or more correlation filters to one or more second images.

9. The system of claim 8, wherein the blurring increases blur based at least on a distance from the target object in the one or more image areas.

10. The system of claim 8, wherein the blurring includes one or more of:
   blurring one or more color channels of the one or more image areas; or
   blurring one or more feature channels of the one or more image areas.

11. The system of claim 8, wherein the blurring uses a blur filter having one or more properties that are based at least on a size of the target object.

12. The system of claim 8, wherein the one or more image areas include one or more scaled image areas that are scaled to a template size.

13. The system of claim 8, wherein the operations comprise performing multi-object tracking across frames of one or more videos using the one or more object locations.

14. The system of claim 8, wherein the system is comprised in at least one of:
   a control system for an autonomous or semi-autonomous machine;
   a perception system for an autonomous or semi-autonomous machine;
   a system for performing simulation operations;
   a system for performing real-time streaming;
   a system for performing deep learning operations;
   a system implemented using an edge device;
   a system implemented using a robot;
   a system for presenting at least one of virtual reality content or augmented reality content;
   a system implemented at least partially in a data center; or
   a system implemented at least partially using cloud computing resources.

15. A processor comprising:
one or more circuits to determine one or more object locations based at least on applying one or more correlation filters to one or more first images, the one or more correlation filters updated, at least in part, using one or more image areas based at least on applying focused windowing to one or more image areas, the focused windowing including blurring one or more regions corresponding to one or more backgrounds of one or more objects in the one or more image areas based at least on a distance of the one or more regions from a target object in the one or more image areas, the one or more image areas corresponding to one or more locations of the one or more objects in one or more second images.

16. The processor of claim 15, wherein the blurring is performed using a Gaussian filter.

17. The processor of claim 15, wherein the blurring includes one or more of:
   blurring one or more color channels of the one or more image areas; or
   blurring one or more feature channels of the one or more image areas.

18. The processor of claim 15, further comprising determining one or more properties of a blur filter used to perform the blurring based at least on a size of the target object.

19. The processor of claim 15, wherein the one or more image areas include one or more scaled image areas that are scaled to a template size.

20. The processor of claim 15, wherein the processor is comprised in at least one of:
   a control system for an autonomous or semi-autonomous machine;
   a perception system for an autonomous or semi-autonomous machine;
   a system for performing simulation operations;
   a system for performing real-time streaming;
   a system for performing deep learning operations;
   a system implemented using an edge device;
   a system implemented using a robot;
   a system for presenting at least one of virtual reality content or augmented reality content;
   a system implemented at least partially in a data center; or
   a system implemented at least partially using cloud computing resources.

* * * * *